US012736780B2

(12) United States Patent
Huang et al.

(10) Patent No.: US 12,736,780 B2
(45) Date of Patent: Sep. 15, 2026

(54) CAMERA OPTICAL LENS

(71) Applicant: Changzhou AAC Raytech Optronics Co., Ltd., Changzhou City (CN)

(72) Inventors: Zhen Huang, Changzhou (CN); Lu Pan, Changzhou (CN); Shunda Zhou, Changzhou (CN); Shijia Zhao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 257 days.

(21) Appl. No.: 18/770,698

(22) Filed: Jul. 12, 2024

(65) Prior Publication Data

US 2025/0327994 A1 Oct. 23, 2025

(30) Foreign Application Priority Data

Apr. 19, 2024 (CN) ......................... 202410484490.0

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/06; G02B 13/18; G02B 1/00
See application file for complete search history.

(56) References Cited

U.S. PATENT DOCUMENTS

2021/0048631 A1* 2/2021 Fukaya .................... G02B 9/64
2021/0063696 A1* 3/2021 Kamada ................... G02B 9/64
2022/0221689 A1* 7/2022 Chen ........................ G02B 9/64
2024/0248284 A1* 7/2024 Zhang ...................... G02B 9/64
2026/0029615 A1* 1/2026 Kim ......................... G02B 9/62

* cited by examiner

*Primary Examiner* — Mariam Qureshi
(74) *Attorney, Agent, or Firm* — Wiersch Law Group

(57) ABSTRACT

The present disclosure relates to the field of optical lenses, and discloses a camera optical lens sequentially including seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; and the following relational expressions are satisfied:

$$0.90 \leq d1_{1.5}/d13_{1.5} \leq 1.70;$$

$$1.00 \leq (d3_{1.5}+d5_{1.5}+d7_{1.5})/(d9_{1.5}+d11_{1.5}) \leq 1.80;$$

$$1.10 \leq d13_{1.5}/d13 \leq 2.00.$$

The camera optical lens has excellent optical characteristics of good processibility, ultra-thin, and is particularly suitable for a mobile phone camera lens component and a WEB camera lens which are composed of camera elements such as CCD, CMOS with high definition and a vehicle-mounted lens.

20 Claims, 8 Drawing Sheets

CAMERA OPTICAL LENS

TECHNICAL FIELD

The present disclosure relates to the field of optical lens and, in particular, to a camera optical lens applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of light weight, thin and portable, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the optical sensor is continuously reduced and the requirements on the imaging quality of the system are continuously improved, the structure with seven lenses gradually appears in the lens design. There is an urgent need for a camera lens having good processability and is ultra-thin.

SUMMARY

In view of the above problems, an object of the present disclosure is to provide a camera optical lens meeting design requirements of good optical performance and ultra-thin.

In order to realize the above object, the technical solution of the present disclosure provides a camera optical lens sequentially includes seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; an object-side surface of the first lens is convex in the paraxial region, an image-side surface of the first lens is concave in the paraxial region; an object-side surface of the second lens is convex in the paraxial region, an image-side surface of the second lens is concave in the paraxial region; an object-side surface of the third lens is concave in the paraxial region, an image-side surface of the third lens is concave in the paraxial region; an object-side surface of the fourth lens is convex in the paraxial region, an image-side surface of the fourth lens is convex in the paraxial region; an object-side surface of the fifth lens is convex in the paraxial region, an image-side surface of the fifth lens is concave in the paraxial region; an object-side surface of the sixth lens is convex in the paraxial region, an image-side surface of the sixth lens is convex in the paraxial region; an object-side surface of the seventh lens is convex in the paraxial region, an image-side surface of the seventh lens is concave in the paraxial region;

wherein, an on-axis distance from the image-side surface of the seventh lens to an image surface is BF, a total optical length from the object-side surface of the first lens to an image surface of the camera optical lens along an optic axis of the camera optical lens is TTL, a focal length of the sixth lens is f6, a focal length of the seventh lens is f7, a central curvature radius of the object-side surface of the sixth lens in the paraxial region is R11, a central curvature radius of the object-side surface of the seventh lens in the paraxial region is R13, an on-axis thickness of the first lens is d1, an on-axis distance from the first lens to the second lens is d2, an on-axis thickness of the second lens is d3, an on-axis thickness of the seventh lens is d13, an thickness of the first lens along a direction parallel to the optical axis at a radius of 1.5 mm is $d1_{1.5}$, an thickness of the second lens along a direction parallel to the optical axis at a radius of 1.5 mm is $d3_{1.5}$, an thickness of the third lens along a direction parallel to the optical axis at a radius of 1.5 mm is $d5_{1.5}$, an thickness of the fourth lens along a direction parallel to the optical axis at a radius of 1.5 mm is $d7_{1.5}$, an thickness of the fifth lens along a direction parallel to the optical axis at a radius of 1.5 mm is $d9_{1.5}$, an thickness of the sixth lens along a direction parallel to the optical axis at a radius of 1.5 mm is $d11_{1.5}$, an thickness of the seventh lens along a direction parallel to the optical axis at a radius of 1.5 mm is $d13_{1.5}$, and the following relational expressions are satisfied:

$$0.16 \le BF/TTL \le 0.25;$$

$$2.10 \le f6/R11 - f7/R13 \le 2.90;$$

$$3.50 \le (d1 + d3)/d2 \le 9.00;$$

$$0.90 \le d1_{1.5}/d13_{1.5} \le 1.70;$$

$$1.00 \le (d3_{1.5} + d5_{1.5} + d7_{1.5})/(d9_{1.5} + d11_{1.5}) \le 1.80; \text{ and}$$

$$1.10 \le d13_{1.5}/d13 \le 2.00.$$

As an improvement, the following relational expression is satisfied:

$$1.00 \le d1_{1.5}/d13_{1.5} \le 1.50.$$

As an improvement, the following relational expression is satisfied:

$$1.20 \le (d3_{1.5} + d5_{1.5} + d7_{1.5})/(d9_{1.5} + d11_{1.5}) \le 1.55.$$

As an improvement, the following relational expression is satisfied:

$$1.25 \le d13_{1.5}/d13 \le 1.80.$$

As an improvement, a focal length of the third lens is f3, a focal length of the fourth lens is f4, an on-axis thickness of the third lens is d5, an on-axis thickness of the fourth lens is d7, and the following relational expression is satisfied: $-120.00 \le f3/d5+f4/d7 \le -50.00$.

As an improvement, a central curvature radius of the object-side surface of the fifth lens in the paraxial region is R9, a central curvature radius of the image-side surface of the fifth lens in the paraxial region is R10, and the following relational expression is satisfied:

$$3.10 \le (R9 + R10)/(R9 - R10) \le 8.50.$$

As an improvement, the following relational expression is satisfied: $-105.00 \le f3/d5+f4/d7 \le -60.00$.

As an improvement, the following relational expression is satisfied:

$$3.80 \le (R9+R10)/(R9-R10) \le 7.00.$$

As an improvement, the first lens is made of glass.

The present disclosure further provides a camera optical lens, the camera optical lens sequentially includes seven lenses, and the seven lenses from an object side to an image side are: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; an object-side surface of the first lens is convex in the paraxial region, an image-side surface of the first lens is concave in the paraxial region; an object-side surface of the second lens is convex in the paraxial region, an image-side surface of the second lens is concave in the paraxial region; an object-side surface of the third lens is concave in the paraxial region, an image-side surface of the third lens is concave in the paraxial region; an object-side surface of the fourth lens is convex in the paraxial region, an image-side surface of the fourth lens is convex in the paraxial region; an object-side surface of the fifth lens is convex in the paraxial region, an image-side surface of the fifth lens is concave in the paraxial region; an object-side surface of the sixth lens is convex in the paraxial region, an image-side surface of the sixth lens is convex in the paraxial region; an object-side surface of the seventh lens is convex in the paraxial region, an image-side surface of the seventh lens is concave in the paraxial region;

wherein a focal length of the camera optical lens is f, a combined focal length of the first lens and the second lens is f12, an on-axis thickness of the first lens is d1, an on-axis thickness of the second lens is d3, an on-axis thickness of the seventh lens is d13, an thickness of the first lens along a direction parallel to the optical axis at a radius of 1.5 mm is $d1_{1.5}$, an thickness of the second lens along a direction parallel to the optical axis at a radius of 1.5 mm is $d3_{1.5}$, an thickness of the third lens along a direction parallel to the optical axis at a radius of 1.5 mm is $d5_{1.5}$, an thickness of the fourth lens along a direction parallel to the optical axis at a radius of 1.5 mm is $d7_{1.5}$, an thickness of the fifth lens along a direction parallel to the optical axis at a radius of 1.5 mm is $d9_{1.5}$, an thickness of the sixth lens along a direction parallel to the optical axis at a radius of 1.5 mm is $d11_{1.5}$, an thickness of the seventh lens along a direction parallel to the optical axis at a radius of 1.5 mm is $d13_{1.5}$, a sum of on-axis thicknesses of the first lens, the second lens, the third lens, the fourth lens, the fifth lens, the sixth lens and the seventh lens is Ed, a total optical length from the object-side surface of the first lens to an image surface of the camera optical lens along an optic axis is TTL, and the following relational expressions are satisfied:

$$0.90 \le d1_{1.5}/d13_{1.5} \le 1.70;$$

$$1.00 \le (d3_{1.5}+d5_{1.5}+d7_{1.5})/(d9_{1.5}+d11_{1.5}) \le 180; \text{ and}$$

$$1.10 \le d13_{1.5}/d13 \le 2.00;$$

-continued $$0.30 \le \sum d/TTL \le 0.65;$$

$$1.20 \le (d1+d3+d13)/d1 \le 2.30;$$

$$0.90 \le f12/f \le 1.60.$$

As an improvement, the following relational expression is satisfied:

$$0.38 \le \sum d/TTL \le 0.58.$$

As an improvement, the following relational expression is satisfied:

$$1.50 \le (d1+d3+d13)/d1 \le 2.00.$$

As an improvement, the following relational expression is satisfied:

$$1.10 \le f12/f \le 1.40.$$

As an improvement, the following relational expression is satisfied:

$$1.00 \le d1_{1.5}/d13_{1.5} \le 1.50.$$

As an improvement, the following relational expression is satisfied:

$$1.20 \le (d3_{1.5}+d5_{1.5}+d7_{1.5})/(d9_{1.5}+d11_{1.5}) \le 1.55.$$

As an improvement, the following relational expression is satisfied:

$$1.25 \le d13_{1.5}/d13 \le 1.80.$$

As an improvement, a central curvature radius of the object-side surface of the first lens is R1 in the paraxial region, a central curvature radius of the image-side surface of the first lens is R2 in the paraxial region, and the following relational expression is satisfied:

$$-2.50 \le (R1+R2)/(R1-R2) \le -1.60.$$

As an improvement, an on-axis thickness of the fourth lens is d7, an on-axis distance from the fourth lens and the fifth lens is d8, an on-axis thickness of the fifth lens is d9, and the following relational expression is satisfied:

$$1.10 \le (d7+d9)/d8 \le 2.10.$$

As an improvement, the following relational expression is satisfied:

$$-2.20 \leq (R1+R2)/(R1-R2) \leq -1.90.$$

As an improvement, the following relational expression is satisfied:

$$1.40 \leq (d7+d9)/d8 \leq 1.75.$$

As an improvement, the first lens is made of glass.

The present disclosure has the following beneficial effects: The camera optical lens has excellent optical characteristics of good processibility, ultra-thin, and is particularly suitable for a mobile phone camera lens component and a WEB camera lens which are composed of camera elements such as CCD, CMOS with high definition and a vehicle-mounted lens.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
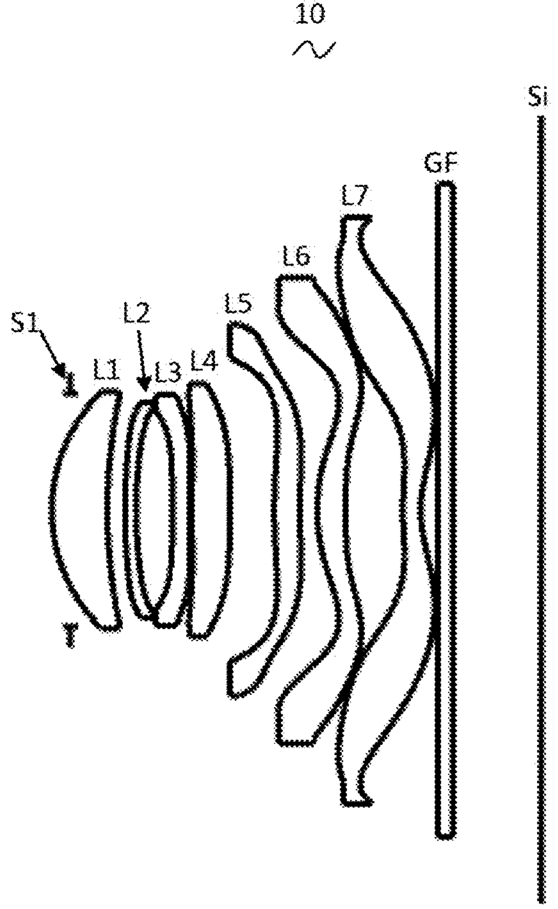
FIG. 1 is a structural schematic diagram of a camera optical lens according to Embodiment 1 of the present disclosure.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure. In order to more clearly illustrate objectives, technical solutions, and advantages of Embodiments of the present disclosure, the technical solutions in Embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Referring to FIGS. 1-16, the technical solution of the present disclosure provides camera optical lenses 10, 20, 30 and 40. FIG. 1, FIG. 5, FIG. 9, and FIG. 13 show camera optical lenses 10, 20, 30, and 40 according to the present disclosure, and the camera optical lenses 10, 20, 30, and 40 include seven lenses. The camera optical lens sequentially includes from an object side to an image side: an aperture S1; a first lens L1, a second lens L2, a third lens L3, a fourth lens L4, a fifth lens L5, a sixth lens L6 and a seventh lens L7. An optical element such as a grating filter GF may be provided between the seventh lens L7 and an image surface Si.

The first lens L1 is made of glass, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. The glass and the resin lens are matched to reduce chromatic aberration and improve the performance of the optical camera lens. The lenses may also be made of other materials.

The first lens has positive refractive power, the object-side surface of the first lens is convex in the paraxial region, the image-side surface of the first lens is concave in the paraxial region; the second lens has negative refractive power, the object-side surface of the second lens is convex in the paraxial region, the image-side surface of the second lens is concave in the paraxial region; the third lens has negative refractive power, the object-side surface of the third lens is concave in the paraxial region, the image-side surface of the third lens is concave in the paraxial region; the fourth lens has positive refractive power, the object-side surface of the fourth lens is convex in the paraxial region, the image-side surface of the fourth lens is convex in the paraxial region; the fifth lens has negative refractive power, the object-side surface of the fifth lens is convex in the paraxial region, the image-side surface of the fifth lens is concave in the paraxial region; the sixth lens has positive refractive power, the object-side surface of the sixth lens is convex in the paraxial region, the image-side surface of the sixth lens is convex in the paraxial region; the seventh lens has negative refractive power, the object-side surface of the seventh lens is convex in the paraxial region, the image-side surface of the seventh lens is concave in the paraxial region. The object-side surface and the image-side surface of each lens may also be provided with other concave and convex distributions.

The object-side surface and the image-side surface of the first lens L1, the second lens L2, the third lens L3, the fourth lens L4, the fifth lens L5, the sixth lens L6, and the seventh lens L7 are aspheric surfaces.

An on-axis distance from the image-side surface of the seventh lens to the image surface is defined as BF, a total optical length from the object-side surface of the first lens to an image surface of the camera optical lens along an optic axis is defined as TTL, and the following relational expression is satisfied:

$$0.16 \le BF/TTL \le 0.25,$$

by reasonably configuring the back focal ratio of the optical system, it may shorten the total length of the optical system to realize miniaturization design, and it is also beneficial to reasonably control the incident angle of the main light from the outermost field of view to the imaging surface, so as to avoid the decrease of relative illumination caused by the excessive incident angle of the main light in the outermost field of view, which is beneficial to improve the imaging quality of the optical system.

A focal length of the sixth lens is defined as f6, a focal length of the seventh lens is defined as f7, a central curvature radius of the object-side surface of the sixth lens in the paraxial region is defined as R11, a central curvature radius of the object-side surface of the seventh lens in the paraxial region is defined as R13, and the following relational expression is satisfied:

$$2.10 \le f6/R11 - f7/R13 \le 2.90,$$

by reasonably controlling the relationship between the focal lengths of the sixth lens and the seventh lens and the paraxial curvature radius of the object-side surface, it is beneficial to reasonably design the incident angle of the light on the object-side surface of the sixth lens and the seventh lens, and it is beneficial to realize ultra-thin.

An on-axis thickness of the first lens is defined as d1, an on-axis distance from the first lens to the second lens is defined as d2, an on-axis thickness of the second lens is defined as d3, and the following relational expression is satisfied:

$$3.50 \le (d1 + d3)/d2 \le 9.00,$$

within the range of the relational expression, it is easy to realize wide-angle and ultra-thin and have good optical characteristics.

An thickness of the first lens along a direction parallel to the optical axis at a radius of 1.5 mm is defined as $d1_{1.5}$, an thickness of the seventh lens along a direction parallel to the optical axis at a radius of 1.5 mm is defined as $d13_{1.5}$, and the following relational expression is satisfied:

$$0.90 \le d1_{1.5}/d13_{1.5} \le 1.70,$$

by reasonably controlling a ratio of thicknesses of the first lens and the seventh lens at a radius of 1.5 mm in a direction parallel to the optical axis, it is beneficial to improve processability of the lens, in addition, it is beneficial to realize ultra-thin. As an improvement, the following relational expression is satisfied:

$$1.00 \le d1_{1.5}/d13_{1.5} \le 1.50.$$

An thickness of the second lens along a direction parallel to the optical axis at a radius of 1.5 mm is defined as $d3_{1.5}$, an thickness of the third lens along a direction parallel to the optical axis at a radius of 1.5 mm is defined as $d5_{1.5}$, an thickness of the fourth lens along a direction parallel to the optical axis at a radius of 1.5 mm is defined as $d7_{1.5}$, an thickness of the fifth lens along a direction parallel to the optical axis at a radius of 1.5 mm is defined as $d9_{1.5}$, an thickness of the sixth lens along a direction parallel to the optical axis at a radius of 1.5 mm is defined as $d11_{1.5}$, and the following relational expression is satisfied:

$$1.00 \le (d3_{1.5} + d5_{1.5} + d7_{1.5})/(d9_{1.5} + d11_{1.5}) \le 1.80,$$

by reasonably controlling a relationship between thicknesses of the second to sixth lenses at a radius of 1.5 mm in a direction parallel to the optical axis, which is beneficial to the correction of aberration and is beneficial to shorten the total optical length. As an improvement, the following relational expression is satisfied:

$$1.20 \le (d3_{1.5} + d5_{1.5} + d7_{1.5})/(d9_{1.5} + d11_{1.5}) \le 1.55.$$

An on-axis thickness of the seventh lens is defined as d13, an thickness of the seventh lens at a radius of 1.5 mm in a direction parallel to the optical axis is defined as $d13_{1.5}$, and the following relational expression is satisfied:

$$1.10 \le d13_{1.5}/d13 \le 2.00,$$

by reasonably controlling a ratio of a thickness of the seventh lens at a radius of 1.5 mm in a direction parallel to the optical axis to a center thickness, it is beneficial to improve processability of the lens and improve production yield. As an improvement, the following relational expression is satisfied:

$$1.25 \le d13_{1.5}/d13 \le 1.80.$$

A focal length of the third lens is defined as f3, a focal length of the fourth lens is defined as f4, an on-axis thickness of the third lens is defined as d5, an on-axis thickness of the fourth lens is defined as d7, and the following relational expression is satisfied:

$$120.00 \le f3/d5 + f4/d7 \le -50.00,$$

by reasonably controlling a ratio of an on-axis thickness to a focal length of the third lens and the fourth lens, it is beneficial to realize wide-angle and improve the processing yield of the third lens and the fourth lens. As an improvement, the following relational expression is satisfied:

$$-105.00 \leq f3/d5 + f4/d7 \leq -60.00.$$

A central curvature radius of the object-side surface of the fifth lens in the paraxial region is defined as R9, a central curvature radius of the image-side surface of the fifth lens in the paraxial region is defined as R10, and the following relational expression is satisfied:

$$3.10 \leq (R9 + R10)/(R9 - R10) \leq 8.50,$$

within the range of the relational expression, the surface type of the fifth lens may be adjusted to control the direction of light travel, which helps to realize a balance between the viewing angle, volume and the size of the imaging surface. As an improvement, the following relational expression is satisfied:

$$3.80 \leq (R9 + R10)/(R9 - R10) \leq 7.00.$$

A sum of on-axis thicknesses of the first lens, the second lens, the third lens, the fourth lens, the fifth lens, the sixth lens and the seventh lens is defined as Σd, a total optical length from the object-side surface of the first lens to an image surface of the camera optical lens along an optic axis is defined as TTL, and the following relational expression is satisfied:

$$0.30 \leq \sum d/TTL \leq 0.65,$$

by reasonably controlling a ratio of a sum of the on-axis thickness of each lens to the TTL to realize ultra-thin. As an improvement, the following relational expression is satisfied:

$$0.38 \leq \sum d/TTL \leq 0.58.$$

An on-axis thickness of the first lens is defined as d1, an on-axis thickness of the second lens is defined as d3, an on-axis thickness of the seventh lens is defined as d13, and the following relational expression is satisfied:

$$1.20 \leq (d1 + d3 + d13)/d1 \leq 2.30,$$

by reasonably controlling center thicknesses of the first lens, the second lens, and the seventh lens, it is beneficial to shorten the TTL. As an improvement, the following relational expression is satisfied:

$$1.50 \leq (d1 + d3 + d13)/d1 \leq 2.00.$$

A focal length of the camera optical lens is defined as f, a combined focal length of the first lens and the second lens is defined as f12, the following relational expression is satisfied:

$$0.90 \leq f12/f \leq 1.60,$$

the focal lengths of the first lens L1 and the second lens L2 are reasonably configured to eliminate chromatic aberration, reduce spherical aberration, correct astigmatism, and improve resolving power. As an improvement, the following relational expression is satisfied:

$$1.10 \leq f12/f \leq 1.40.$$

A central curvature radius of the object-side surface of the first lens is defined as R1 in the paraxial region, a central curvature radius of the image-side surface of the first lens is defined as R2 in the paraxial region, and the following relational expression is satisfied:

$$-2.50 \leq (R1 + R2)/(R1 - R2) \leq -1.60,$$

by reasonably controlling the shape of the first lens, the surface type and refractive power of the first lens may be adjusted to help receive light from a larger angle of view. As an improvement, the following relational expression is satisfied:

$$-2.20 \leq (R1 + R2)/(R1 - R2) \leq -1.90.$$

An on-axis thickness of the fourth lens is defined as d7, an on-axis distance from the fourth lens and the fifth lens is defined as d8, an on-axis thickness of the fifth lens is defined as d9, and the following relational expression is satisfied:

$$1.10 \leq (d7 + d9)/d8 \leq 2.10,$$

by reasonably controlling thicknesses and intervals of the fourth lens and the fifth lens, it is beneficial to reduce assembly sensitivity of the fourth lens and the fifth lens and improve assembly yield. As an improvement, the following relational expression is satisfied:

$$1.40 \leq (d7 + d9)/d8 \leq 1.75.$$

Compared with the prior art, the camera optical lens provided by the present disclosure is configured with $$0.16 \leq BF/TTL \leq 0.25;\ 2.10 \leq f6/R11 - f7/R13 \leq 2.90;$$

$$3.50 \leq (d1 + d3)/d2 \leq 9.00;\ 0.90 \leq d1_{1.5}/d13_{1.5} \leq 1.70;$$

$$1.00 \leq (d3_{1.5} + d5_{1.5} + d7_{1.5})/(d9_{1.5} + d11_{1.5}) \leq 1.80;$$

$$1.10 \leq d13_{1.5}/d13 \leq 2.00,$$

which may shorten the total length of the optical system and avoid the decrease of the relative illumination caused by the excessive incident angle of the main light in the outermost field of view, thereby improving the imaging quality of the optical system. The reasonable design of the incident angle of the light on the object-side surface of the sixth lens and the seventh lens is beneficial to realize ultra-thin. It has good optical characteristics and satisfies wide-angle and ultra-thin. In addition, the thickness of each lens at a radius of 1.5 mm along a direction parallel to the optical axis is reasonably controlled, which is beneficial to improve the processability of the lens and the production yield, in addition, it is beneficial to realize ultra-thin design.

Compared with the prior art, the camera optical lens provided by the present disclosure is configured with $$0.90 \leq d1_{1.5}/d13_{1.5} \leq 1.70;$$

$$1.00 \leq (d3_{1.5} + d5_{1.5}d7_{1.5})/(d9_{1.5} + d11_{1.5}) \leq 1.80;$$

$$1.10 \leq d13_{1.5}/d13 \leq 2.00;\ 0.30 \leq \sum d/TTL \leq 0.65;$$

$$1.20 \leq (d1 + d3 + d13)/d1 \leq 2.30;\ 0.90 \leq f12/f \leq 1.60,$$

which may eliminate the chromatic aberration, reduce the spherical aberration, correct the astigmatism and improve the resolving power, in addition, it may satisfy ultra-thin. In addition, the thickness of each lens at a radius of 1.5 mm along a direction parallel to the optical axis is reasonably controlled, which is beneficial to improve the processability of the lens and the production yield, in addition, it is beneficial to realize ultra-thin design.

The camera optical lens of the present disclosure will be described below with examples. The reference signs recited in each example are shown below. The units of focal length, on-axis distance, central curvature radius and on-axis thickness are mm.

TTL: total optical length (an on-axis distance from the object-side surface of the first lens L1 to the image surface Si), in mm;

F-number FNO: refers to the ratio of the effective focal length of the camera optical lens to the entrance pupil diameter of the camera optical lens.

The technical solutions of the present disclosure will be described in detail in four embodiments, the technical effect of the disclosure cannot be realized when the range of the above relational expression is exceeded.

Embodiment 1

Table 1 and Table 2 show design data of the camera optical lens 10 according to Embodiment 1 of the present disclosure.

TABLE 1

| | R | d | | nd | | νd | |
|---|---|---|---|---|---|---|---|
| S1 | ∞ | d0 = | −0.387 | | | | |
| R1 | 3.534 | d1 = | 1.145 | nd1 | 1.4959 | ν1 | 81.65 |
| R2 | 9.849 | d2 = | 0.365 | | | | |
| R3 | 10.937 | d3 = | 0.231 | nd2 | 1.6700 | ν2 | 19.39 |
| R4 | 8.997 | d4 = | 0.749 | | | | |
| R5 | −95.190 | d5 = | 0.355 | nd3 | 1.6700 | ν3 | 19.39 |
| R6 | 37.319 | d6 = | 0.051 | | | | |
| R7 | 37.535 | d7 = | 0.789 | nd4 | 1.5444 | ν4 | 55.82 |
| R8 | −43.542 | d8 = | 0.916 | | | | |
| R9 | 9.965 | d9 = | 0.525 | nd5 | 1.5661 | ν5 | 37.71 |
| R10 | 7.426 | d10 = | 0.381 | | | | |
| R11 | 4.129 | d11 = | 0.591 | nd6 | 1.5444 | ν6 | 55.82 |
| R12 | −43.829 | d12 = | 1.182 | | | | |
| R13 | 7.450 | d13 = | 0.366 | nd7 | 1.5346 | ν7 | 55.69 |
| R14 | 2.447 | d14 = | 0.350 | | | | |
| R15 | ∞ | d15 = | 0.310 | ndg | 1.5168 | νg | 64.17 |
| R16 | ∞ | d16 = | 1.838 | | | | |

The meaning of each reference sign is as follows.

S1: aperture;

R: curvature radius at the center of the optical plane;

R1: central curvature radius of the object-side surface of the first lens L1 in the paraxial region;

R2: central curvature radius of the image-side surface of the first lens L1 in the paraxial region;

R3: central curvature radius of the object-side surface of the second lens L2 in the paraxial region;

R4: central curvature radius of the image-side surface of the second lens L2 in the paraxial region;

R5: central curvature radius of the object-side surface of the third lens L3 in the paraxial region;

R6: central curvature radius of the image-side surface of the third lens L3 in the paraxial region;

R7: central curvature radius of the object-side surface of the fourth lens L4 in the paraxial region;

R8: central curvature radius of the image-side surface of the fourth lens L4 in the paraxial region;

R9: central curvature radius of the object-side surface of the fifth lens L5 in the paraxial region;

R10: central curvature radius of the image-side surface of the fifth lens L5 in the paraxial region;

R11: central curvature radius of the object-side surface of the sixth lens L6 in the paraxial region;

R12: central curvature radius of the image-side surface of the sixth lens L6 in the paraxial region;

R13: central curvature radius of the object-side surface of the seventh lens L7 in the paraxial region;

R14: central curvature radius of the image-side surface of the seventh lens L7 in the paraxial region;

R15: central curvature radius of the object-side surface of the grating filter GF;

R16: central curvature radius of the image-side surface of the grating filter GF;

d: on-axis thickness of lenses, on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the grating filter GF;

d15: on-axis thickness of the grating filter GF;

d16: on-axis distance from the image-side surface of the grating filter GF to the image surface Si;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the grating filter GF.

Table 2 shows aspheric surface data of each lens in the camera optical lens 10 according to Embodiment 1 of the present disclosure.

TABLE 2

| | Conic Coefficient | Aspheric Coefficient | | | | |
|---|---|---|---|---|---|---|
| | k | A4 | A6 | A8 | A10 | A12 |
| R1 | −6.6144E−03 | −1.0658E−03 | 3.7245E−03 | −4.5831E−03 | 3.0120E−03 | −1.1706E−03 |
| R2 | 3.1928E−01 | −1.5135E−03 | −2.4353E−03 | 3.6320E−03 | −2.9610E−03 | 1.4110E−03 |
| R3 | −9.2723E−01 | −6.2427E−03 | 2.0037E−03 | −1.8317E−03 | 1.6965E−03 | −8.3448E−04 |
| R4 | 3.8740E−01 | −4.2984E−03 | 2.7752E−03 | −3.7586E−03 | 3.8945E−03 | −2.2970E−03 |
| R5 | −2.7787E+03 | −5.5051E−03 | −4.6991E−03 | 2.0578E−03 | −1.4580E−03 | 7.0176E−04 |
| R6 | −5.1123E+01 | 4.3220E−03 | −1.3315E−02 | 6.5622E−03 | −2.4502E−03 | 6.8017E−04 |
| R7 | 1.8692E+01 | 1.4214E−03 | −8.5053E−03 | 2.5865E−03 | 4.0853E−04 | −4.5786E−04 |
| R8 | 1.0767E+01 | −1.1028E−02 | 2.0140E−03 | −1.7590E−03 | 9.0272E−04 | −2.7231E−04 |
| R9 | −4.2807E+00 | −1.7491E−02 | 1.3361E−03 | 3.0372E−03 | −2.2594E−03 | 7.3330E−04 |
| R10 | −7.2037E−01 | −1.9319E−02 | −1.6142E−02 | 1.5110E−02 | −7.3072E−03 | 2.4200E−03 |
| R11 | −1.0368E+00 | 3.0746E−02 | −2.2877E−02 | 9.6638E−03 | −3.3610E−03 | 8.6953E−04 |
| R12 | 2.4979E+01 | 4.6004E−02 | −7.0262E−03 | −2.1884E−03 | 1.1686E−03 | −2.6470E−04 |
| R13 | −1.1074E+00 | −4.8968E−02 | 7.7137E−03 | −1.1390E−03 | 1.4717E−04 | −1.2012E−05 |
| R14 | −1.0004E+00 | −6.4028E−02 | 1.4620E−02 | −2.9548E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | −6.6144E−03 | 2.7752E−04 | −3.9470E−05 | 3.0981E−06 | −1.0329E−07 | 0.0000E+00 |
| R2 | 3.1928E−01 | −4.0399E−04 | 6.8906E−05 | −6.4531E−06 | 2.5479E−07 | 0.0000E+00 |
| R3 | −9.2723E−01 | 2.5061E−04 | −4.4785E−05 | 4.4030E−06 | −1.8448E−07 | 0.0000E+00 |
| R4 | 3.8740E−01 | 8.3103E−04 | −1.8012E−04 | 2.1485E−05 | −1.0800E−06 | 0.0000E+00 |
| R5 | −2.7787E+03 | −2.1558E−04 | 3.9821E−05 | −3.8786E−06 | 1.5136E−07 | 0.0000E+00 |
| R6 | −5.1123E+01 | −1.2826E−04 | 1.4104E−05 | −6.4315E−07 | −1.8451E−09 | 0.0000E+00 |
| R7 | 1.8692E+01 | 1.3575E−04 | −2.1442E−05 | 1.8366E−06 | −6.6510E−08 | 0.0000E+00 |
| R8 | 1.0767E+01 | 5.1644E−05 | −5.9526E−06 | 3.5866E−07 | −7.5774E−09 | 0.0000E+00 |
| R9 | −4.2807E+00 | −7.9488E−05 | −3.0151E−05 | 1.5568E−05 | −3.5220E−06 | 4.8629E−07 |
| R10 | −7.2037E−01 | −5.8265E−04 | 1.0333E−04 | −1.3514E−05 | 1.2972E−06 | −9.0101E−08 |
| R11 | −1.0368E+00 | −1.6116E−04 | 2.1309E−05 | −2.0235E−06 | 1.3871E−07 | −6.8321E−09 |
| R12 | 2.4979E+01 | 3.7888E−05 | −3.7841E−06 | 2.7507E−07 | −1.4789E−08 | 5.8548E−10 |
| R13 | −1.1074E+00 | 4.6461E−07 | 7.5632E−09 | −1.9160E−09 | 1.1039E−10 | −3.6033E−12 |
| R14 | −1.0004E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | −6.6144E−03 | 0.0000E+00 | 0.0000E+00 | 0.0000E+00 | 0.0000E+00 | / |
| R2 | 3.1928E−01 | 0.0000E+00 | 0.0000E+00 | 0.0000E+00 | 0.0000E+00 | / |
| R3 | −9.2723E−01 | 0.0000E+00 | 0.0000E+00 | 0.0000E+00 | 0.0000E+00 | / |
| R4 | 3.8740E−01 | 0.0000E+00 | 0.0000E+00 | 0.0000E+00 | 0.0000E+00 | / |
| R5 | −2.7787E+03 | 0.0000E+00 | 0.0000E+00 | 0.0000E+00 | 0.0000E+00 | / |
| R6 | −5.1123E+01 | 0.0000E+00 | 0.0000E+00 | 0.0000E+00 | 0.0000E+00 | / |
| R7 | 1.8692E+01 | 0.0000E+00 | 0.0000E+00 | 0.0000E+00 | 0.0000E+00 | / |

TABLE 2-continued

| | | | | | | |
|---|---|---|---|---|---|---|
| R8 | 1.0767E+01 | 0.0000E+00 | 0.0000E+00 | 0.0000E+00 | 0.0000E+00 | / |
| R9 | −4.2807E+00 | −4.3206E−08 | 2.4160E−09 | −7.7446E−11 | 1.0846E−12 | / |
| R10 | −7.2037E−01 | 4.4007E−09 | −1.4314E−10 | 2.7806E−12 | −2.4377E−14 | / |
| R11 | −1.0368E+00 | 2.3679E−10 | −5.4999E−12 | 7.7044E−14 | −4.9282E−16 | / |
| R12 | 2.4979E+01 | −1.6627E−11 | 3.2028E−13 | −3.7386E−15 | 1.9902E−17 | / |
| R13 | −1.1074E+00 | 7.3591E−14 | −9.2830E−16 | 6.5708E−18 | −1.9644E−20 | / |
| R14 | −1.0004E+00 | −1.8904E−13 | 2.0927E−15 | −1.3728E−17 | 4.0358E−20 | / |

For convenience, the aspheric surface of each lens surface uses the aspheric surface shown in the following formula (1). However, the present disclosure is not limited to the aspheric polynomial form shown in formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24}+A26r^{26}+A28r^{28}+A30r^{30} \quad (1)$$

k is a conic coefficient, A4, A6, A8, A10, A12, A14, A16, A18, A20, A22, A24, A26, A28 and A30 are aspheric coefficients, c is a curvature at a center of an optical surface, r is a vertical distance between a point on an aspheric curve and an optical axis, and z is an aspheric depth (a vertical distance between a point on the aspheric surface and the optical axis, where r is a distance from the point on the aspheric surface to the optical axis, and a vertical distance between the point on the aspheric surface and a tangent plane tangent to a vertex on the aspheric optical axis).

Figure 2:
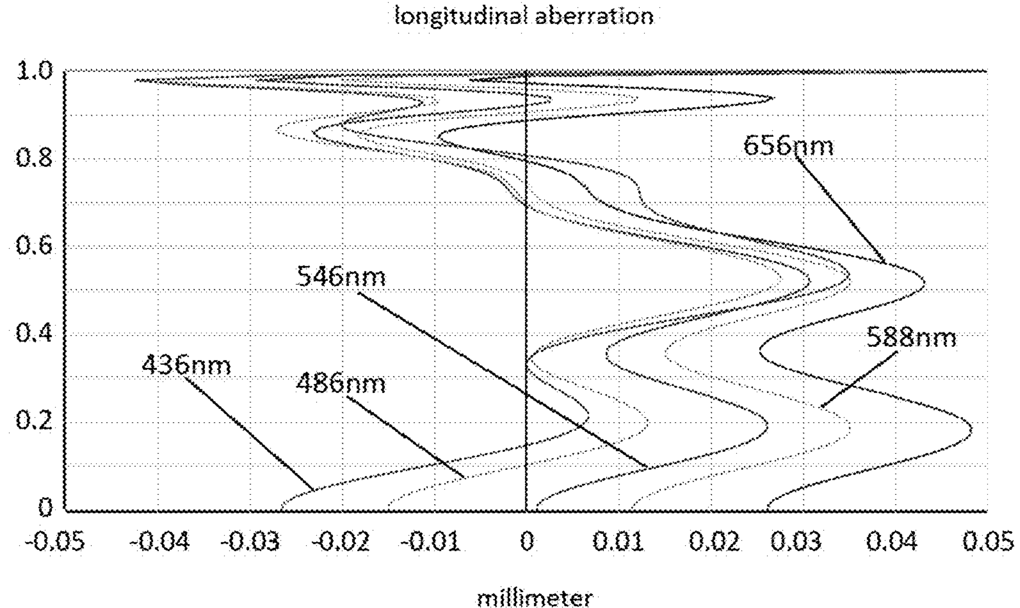
FIG. 2 is a schematic diagram of longitudinal aberration of the camera optical lens shown in FIG. 1.
Figure 3:
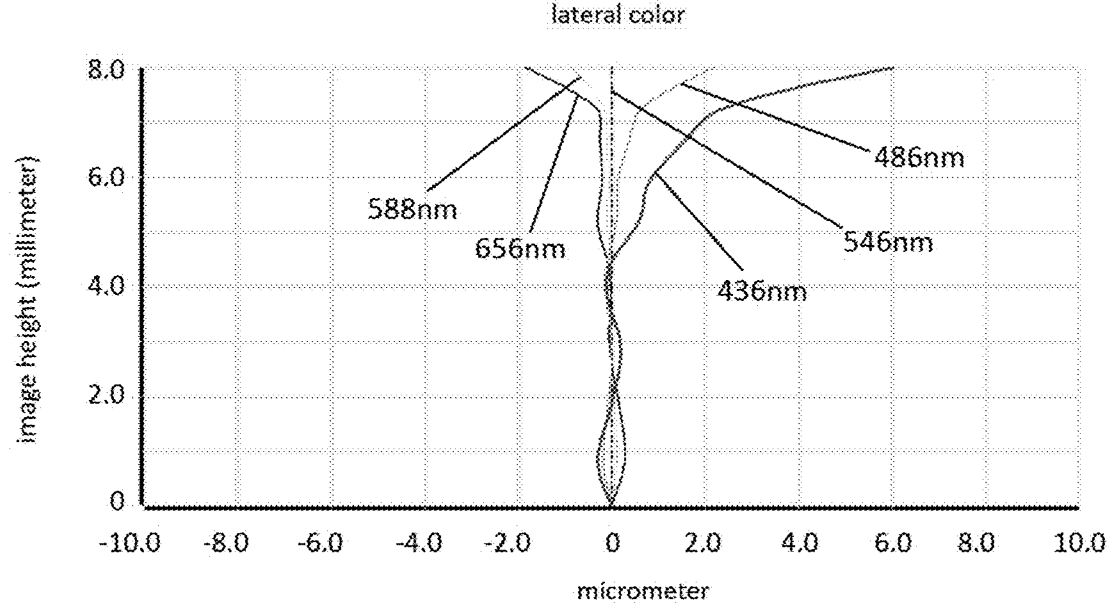
FIG. 3 is a schematic diagram of lateral color of the camera optical lens shown in FIG. 1.
Figure 4:
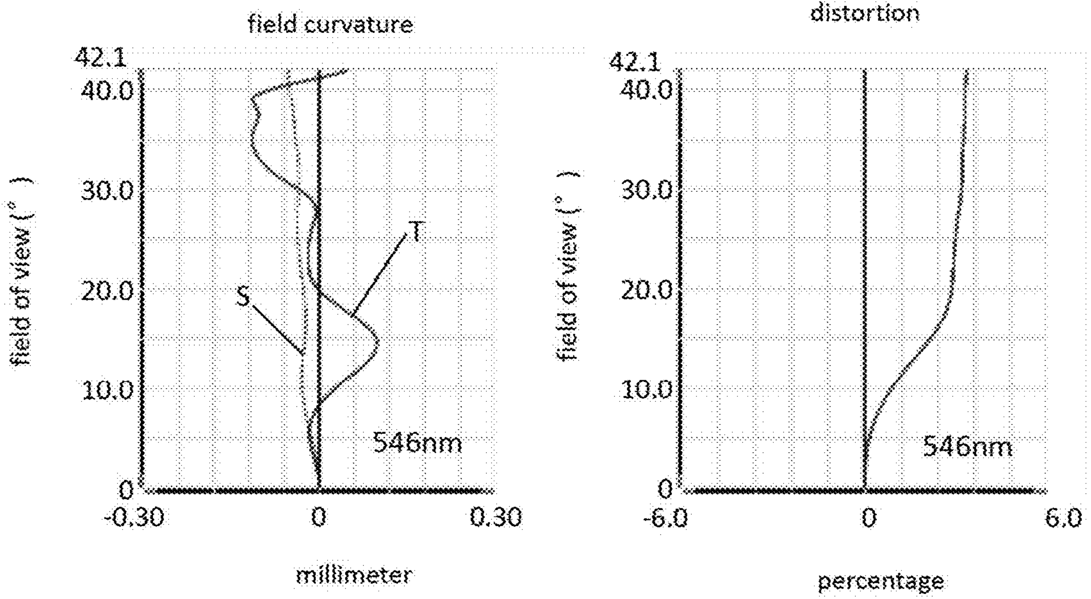
FIG. 4 is a schematic diagram of field curvature and distortion of the camera optical lens shown in FIG. 1.

FIG. 2 and FIG. 3 respectively show longitudinal aberration and lateral color of light with wavelengths of 656 nm, 588 nm, 546 nm, 486 nm and 436 nm after passing through the camera optical lens 10 according to Embodiment 1. FIG. 4 shows field curvature and distortion of light with a wavelength of 546 nm after passing through the camera optical lens 10 according to Embodiment 1. The field curvature S in FIG. 4 is the field curvature in a sagittal direction, and T is the field curvature in a meridional direction.

In the embodiment, the entrance pupil diameter ENPD of the camera optical lens 10 is 4.901 mm, the full field of view (1.0 field of view) image height IH is 8.000 mm, the MIC field of view image height IH is 8.290 mm, the field of view FOV of the full field of view (1.0 field of view) in a diagonal direction is 84.13°, the field of view FOV of the MIC field of view in a diagonal direction is 86.10°, the camera optical lens 10 meets the design requirements of good processability, ultra-thin, and the on-axis and off-axis chromatic aberrations are sufficiently corrected and have excellent optical characteristics.

It may be understood that the 1.0 field of view image height refers to half of the diagonal length of an effective pixel area of the sensor; the MIC field of view image height refers to a field of view height that is expanded from the 1.0 field of view image height and is used to prevent assembly deviation; the FOV in the diagonal direction of the 1.0 field of view refers to the field of view corresponding to the effective pixel area of the sensor; and the FOV in the diagonal direction of the MIC field of view refers to a field of view corresponding to the MIC field of view image height.

Embodiment 2

The meaning of the reference signs of Embodiment 2 is the same as that of Embodiment 1.

Figure 5:
FIG. 5 is a structural schematic diagram of a camera optical lens according to Embodiment 2 of the present disclosure.
Figure 5:
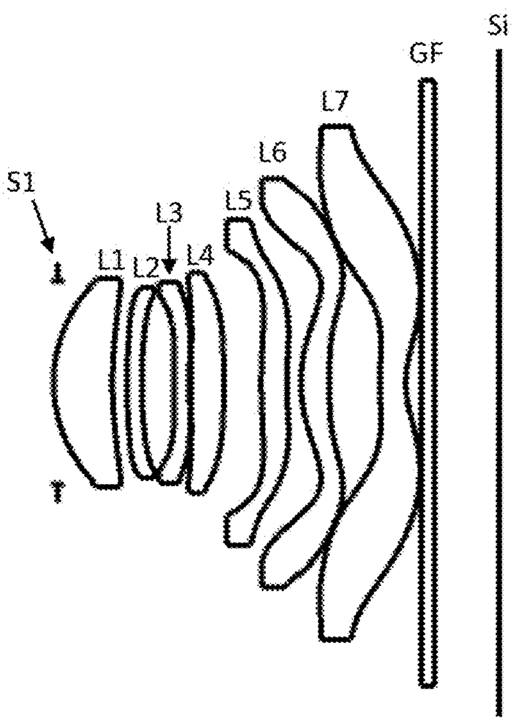

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

| | R | d | | nd | | νd | |
|---|---|---|---|---|---|---|---|
| S1 | ∞ | d0 = | −0.090 | | | | |
| R1 | 3.537 | d1 = | 1.340 | nd1 | 1.4959 | ν1 | 81.65 |
| R2 | 10.359 | d2 = | 0.330 | | | | |
| R3 | 13.001 | d3 = | 0.335 | nd2 | 1.6700 | ν2 | 19.39 |
| R4 | 10.572 | d4 = | 0.747 | | | | |
| R5 | −97.461 | d5 = | 0.338 | nd3 | 1.6700 | ν3 | 19.39 |
| R6 | 35.078 | d6 = | 0.034 | | | | |
| R7 | 28.871 | d7 = | 0.744 | nd4 | 1.5444 | ν4 | 55.82 |
| R8 | −72.109 | d8 = | 0.868 | | | | |
| R9 | 10.111 | d9 = | 0.579 | nd5 | 1.5661 | ν5 | 37.71 |
| R10 | 7.105 | d10 = | 0.330 | | | | |
| R11 | 4.436 | d11 = | 0.650 | nd6 | 1.5444 | ν6 | 55.82 |
| R12 | −35.069 | d12 = | 1.140 | | | | |
| R13 | 8.094 | d13 = | 0.588 | nd7 | 1.5346 | ν7 | 55.69 |
| R14 | 2.431 | d14 = | 0.350 | | | | |
| R15 | ∞ | d15 = | 0.310 | ndg | 1.5168 | νg | 64.17 |
| R16 | ∞ | d16 = | 1.467 | | | | |

Table 4 shows aspheric surface data of each lens in the camera optical lens 20 according to Embodiment 2 of the present disclosure.

TABLE 4

| | Conic Coefficient | Aspheric Coefficient | | | | |
|---|---|---|---|---|---|---|
| | k | A4 | A6 | A8 | A10 | A12 |
| R1 | 0.0000E+00 | −1.1993E−03 | 3.6725E−03 | −4.5845E−03 | 3.0115E−03 | −1.1706E−03 |
| R2 | 0.0000E+00 | −2.0868E−03 | −2.4311E−03 | 3.6306E−03 | −2.9621E−03 | 1.4108E−03 |
| R3 | 0.0000E+00 | −6.1236E−03 | 1.9643E−03 | −1.8345E−03 | 1.6957E−03 | −8.3480E−04 |
| R4 | 0.0000E+00 | −4.3231E−03 | 2.8029E−03 | −3.7708E−03 | 3.8939E−03 | −2.2972E−03 |
| R5 | 0.0000E+00 | −5.8549E−03 | −4.7582E−03 | 2.0554E−03 | −1.4567E−03 | 7.0221E−04 |
| R6 | 0.0000E+00 | 4.4896E−03 | −1.3329E−02 | 6.5635E−03 | −2.4498E−03 | 6.8019E−04 |
| R7 | 0.0000E+00 | 1.4950E−03 | −8.5217E−03 | 2.5820E−03 | 4.0780E−04 | −4.5790E−04 |
| R8 | 0.0000E+00 | −1.1350E−02 | 1.9601E−03 | −1.7533E−03 | 9.0312E−04 | −2.7225E−04 |
| R9 | −1.0000E+00 | −1.6912E−02 | 1.3176E−03 | 3.0338E−03 | −2.2594E−03 | 7.3333E−04 |

TABLE 4-continued

| | | | | | | |
|---|---|---|---|---|---|---|
| R10 | −1.0000E+00 | −1.9480E−02 | −1.6143E−02 | 1.5110E−02 | −7.3072E−03 | 2.4200E−03 |
| R11 | −1.0000E+00 | 3.0823E−02 | −2.2883E−02 | 9.6637E−03 | −3.3610E−03 | 8.6953E−04 |
| R12 | −1.0000E+00 | 4.6043E−02 | −7.0266E−03 | −2.1885E−03 | 1.1686E−03 | −2.6470E−04 |
| R13 | −1.0000E+00 | −4.8935E−02 | 7.7143E−03 | −1.1390E−03 | 1.4717E−04 | −1.2012E−05 |
| R14 | −1.0000E+00 | −6.4016E−02 | 1.4619E−02 | −2.9548E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 0.0000E+00 | 2.7749E−04 | −3.9471E−05 | 3.0977E−06 | −1.0333E−07 | 0.0000E+00 |
| R2 | 0.0000E+00 | −4.0403E−04 | 6.8901E−05 | −6.4539E−06 | 2.5490E−07 | 0.0000E+00 |
| R3 | 0.0000E+00 | 2.5054E−04 | −4.4797E−05 | 4.4023E−06 | −1.8401E−07 | 0.0000E+00 |
| R4 | 0.0000E+00 | 8.3103E−04 | −1.8011E−04 | 2.1485E−05 | −1.0804E−06 | 0.0000E+00 |
| R5 | 0.0000E+00 | −2.1546E−04 | 3.9844E−05 | −3.8801E−06 | 1.4951E−07 | 0.0000E+00 |
| R6 | 0.0000E+00 | −1.2829E−04 | 1.4097E−05 | −6.4366E−07 | −1.8258E−09 | 0.0000E+00 |
| R7 | 0.0000E+00 | 1.3575E−04 | −2.1442E−05 | 1.8368E−06 | −6.6552E−08 | 0.0000E+00 |
| R8 | 0.0000E+00 | 5.1653E−05 | −5.9516E−06 | 3.5822E−07 | −7.6005E−09 | 0.0000E+00 |
| R9 | −1.0000E+00 | −7.9485E−05 | −3.0151E−05 | 1.5568E−05 | −3.5220E−06 | 4.8629E−07 |
| R10 | −1.0000E+00 | −5.8265E−04 | 1.0333E−04 | −1.3514E−05 | 1.2972E−06 | −9.0101E−08 |
| R11 | −1.0000E+00 | −1.6116E−04 | 2.1309E−05 | −2.0235E−06 | 1.3871E−07 | −6.8321E−09 |
| R12 | −1.0000E+00 | 3.7888E−05 | −3.7841E−06 | 2.7507E−07 | −1.4789E−08 | 5.8548E−10 |
| R13 | −1.0000E+00 | 4.6461E−07 | 7.5632E−09 | −1.9160E−09 | 1.1039E−10 | −3.6033E−12 |
| R14 | −1.0000E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 0.0000E+00 | 0.0000E+00 | 0.0000E+00 | 0.0000E+00 | 0.0000E+00 | / |
| R2 | 0.0000E+00 | 0.0000E+00 | 0.0000E+00 | 0.0000E+00 | 0.0000E+00 | / |
| R3 | 0.0000E+00 | 0.0000E+00 | 0.0000E+00 | 0.0000E+00 | 0.0000E+00 | / |
| R4 | 0.0000E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | 0.0000E+00 | 0.0000E+00 | 0.0000E+00 | 0.0000E+00 | 0.0000E+00 | / |
| R7 | 0.0000E+00 | 0.0000E+00 | 0.0000E+00 | 0.0000E+00 | 0.0000E+00 | / |
| R8 | 0.0000E+00 | 0.0000E+00 | 0.0000E+00 | 0.0000E+00 | 0.0000E+00 | / |
| R9 | −1.0000E+00 | −4.3206E−08 | 2.4160E−09 | −7.7446E−11 | 1.0846E−12 | / |
| R10 | −1.0000E+00 | 4.4007E−09 | −1.4314E−10 | 2.7806E−12 | −2.4377E−14 | / |
| R11 | −1.0000E+00 | 2.3679E−10 | −5.5000E−12 | 7.7044E−14 | −4.9281E−16 | / |
| R12 | −1.0000E+00 | −1.6627E−11 | 3.2028E−13 | −3.7386E−15 | 1.9902E−17 | / |
| R13 | −1.0000E+00 | 7.3591E−14 | −9.2830E−16 | 6.5708E−18 | −1.9643E−20 | / |
| R14 | −1.0000E+00 | −1.8904E−13 | 2.0927E−15 | −1.3728E−17 | 4.0358E−20 | / |

Figure 6:
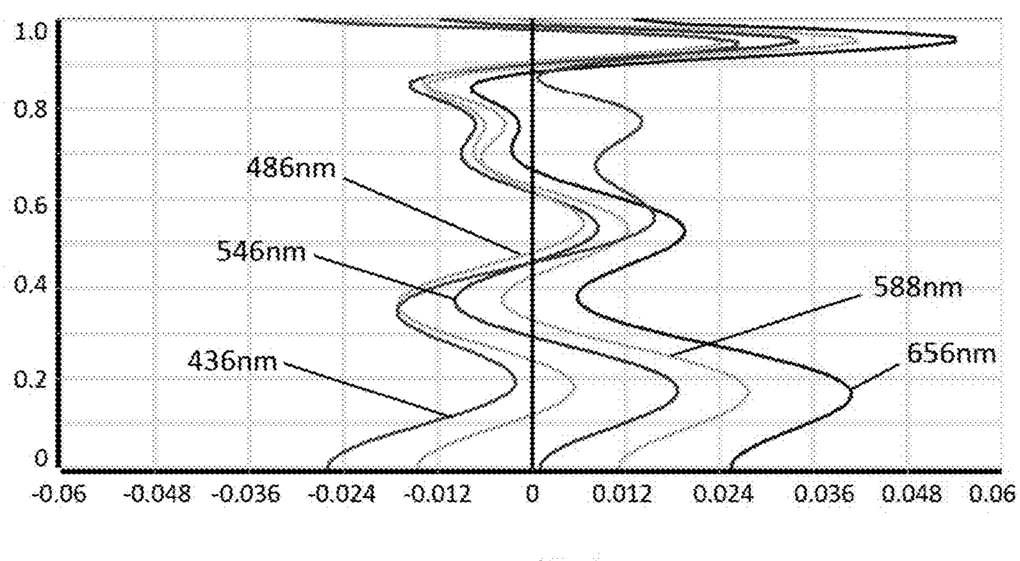
FIG. 6 is a schematic diagram of longitudinal aberration of the camera optical lens shown in FIG. 5.
Figure 7:
FIG. 7 is a schematic diagram of lateral color of the camera optical lens shown in FIG. 5.
Figure 7:
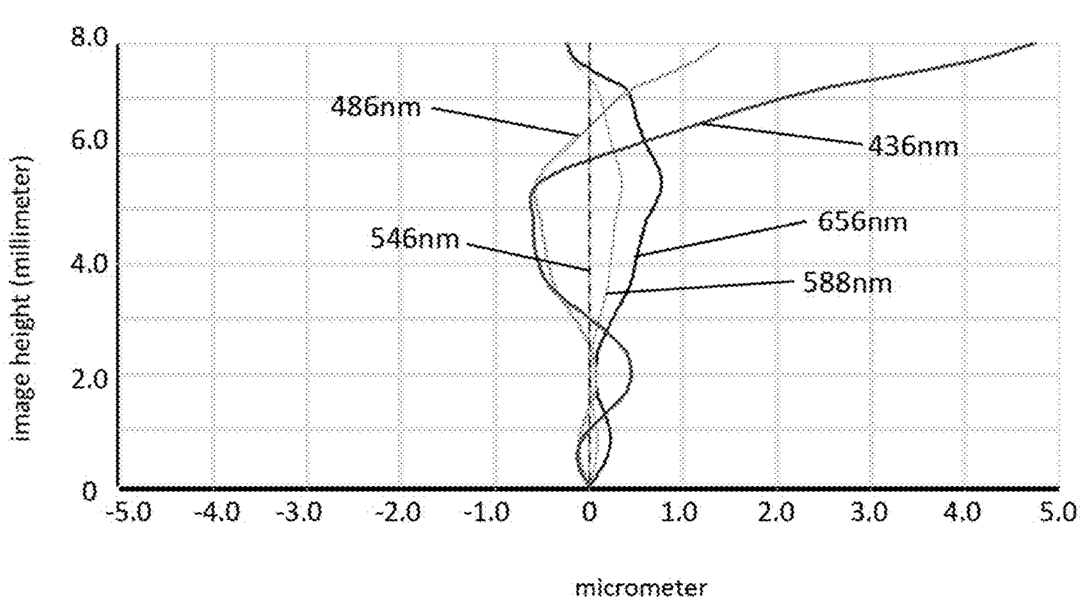
Figure 8:
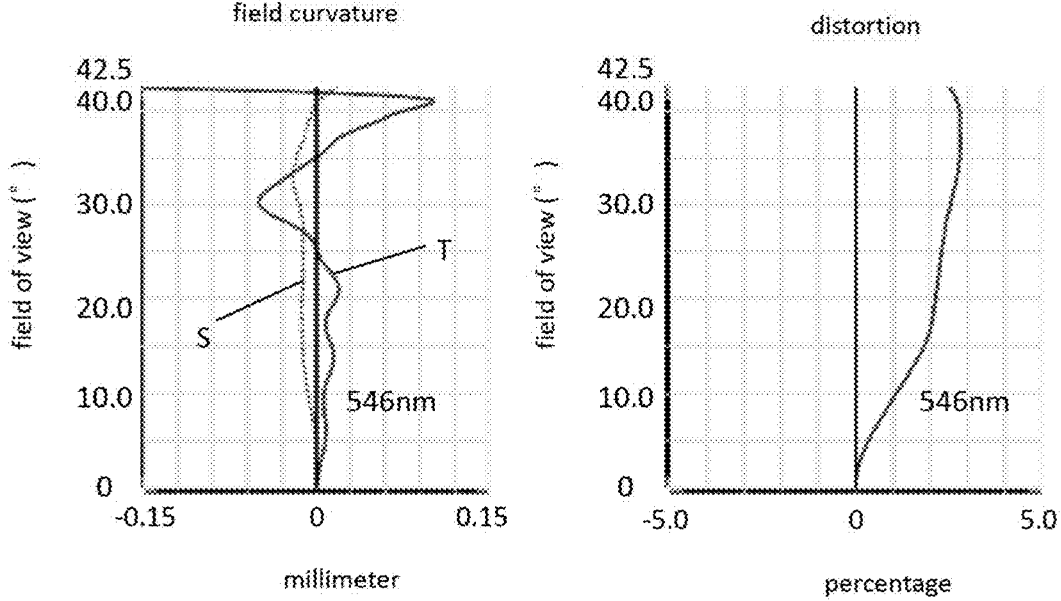
FIG. 8 is a schematic diagram of field curvature and distortion of the camera optical lens shown in FIG. 5.

FIG. 6 and FIG. 7 respectively show longitudinal aberration and lateral color of light with wavelengths of 656 nm, 588 nm, 546 nm, 486 nm and 436 nm after passing through the camera optical lens 20 according to Embodiment 2. FIG. 8 shows field curvature and distortion of light with a wavelength of 546 nm after passing through the camera optical lens 20 according to Embodiment 2. The field curvature S in FIG. 8 is the field curvature in the sagittal direction, and T is the field curvature in the meridian direction.

In the embodiment, the entrance pupil diameter ENPD of the camera optical lens 20 is 4.868 mm, the full field of view (1.0 field of view) image height IH is 8.000 mm, the MIC field of view image height IH is 8.290 mm, the field of view FOV of the full field of view (1.0 field of view) in a diagonal direction is 84.97°, the field of view FOV of the MIC field of view in a diagonal direction is 87.18°, the camera optical lens 20 meets the design requirements of good processability, ultra-thin, and the on-axis and off-axis chromatic aberrations are sufficiently corrected and have excellent optical characteristics.

Embodiment 3

The meaning of the reference signs of Embodiment 3 is the same as that of Embodiment 1.

Figure 9:
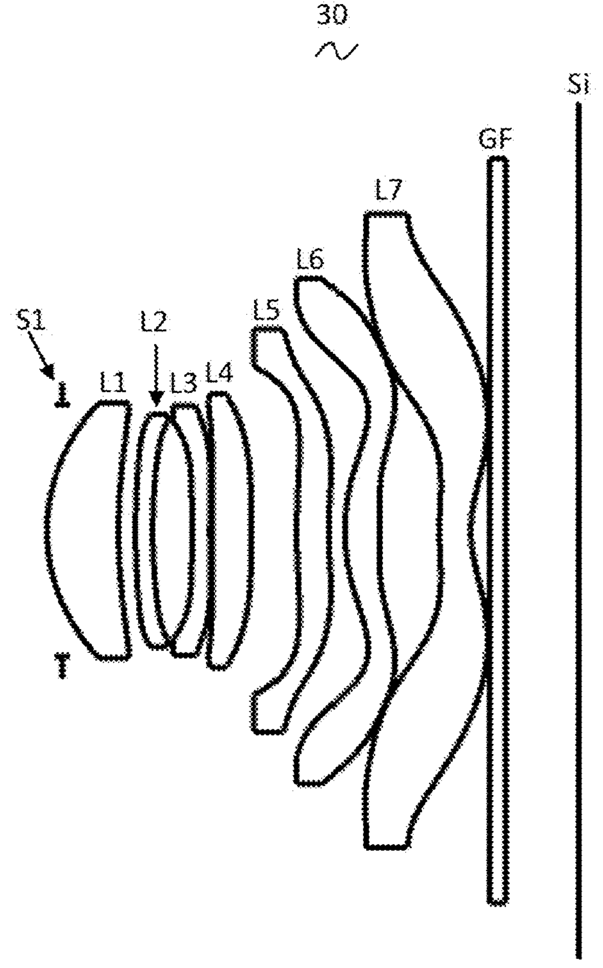
FIG. 9 is a structural schematic diagram of a camera optical lens according to Embodiment 3 of the present disclosure.

FIG. 9 shows a camera optical lens 30 according to Embodiment 3 of the present disclosure.

Table 5 and Table 6 show design data of the camera optical lens 30 according to the Embodiment 3 of the present disclosure.

TABLE 5

| | R | d | | nd | | vd | |
|---|---|---|---|---|---|---|---|
| S1 | ∞ | d0 = | −0.296 | | | | |
| R1 | 3.531 | d1 = | 1.366 | nd1 | 1.4959 | v1 | 81.65 |
| R2 | 10.313 | d2 = | 0.327 | | | | |
| R3 | 12.823 | d3 = | 0.329 | nd2 | 1.6700 | v2 | 19.39 |
| R4 | 10.494 | d4 = | 0.750 | | | | |
| R5 | −91.330 | d5 = | 0.341 | nd3 | 1.6700 | v3 | 19.39 |
| R6 | 36.185 | d6 = | 0.040 | | | | |
| R7 | 29.716 | d7 = | 0.753 | nd4 | 1.5444 | v4 | 55.82 |
| R8 | −66.499 | d8 = | 0.870 | | | | |
| R9 | 10.096 | d9 = | 0.608 | nd5 | 1.5661 | v5 | 37.71 |
| R10 | 7.110 | d10 = | 0.327 | | | | |
| R11 | 4.423 | d11 = | 0.652 | nd6 | 1.5444 | v6 | 55.82 |
| R12 | −36.514 | d12 = | 1.155 | | | | |
| R13 | 7.862 | d13 = | 0.598 | nd7 | 1.5346 | v7 | 55.69 |
| R14 | 2.434 | d14 = | 0.350 | | | | |
| R15 | ∞ | d15 = | 0.310 | ndg | 1.5168 | vg | 64.17 |
| R16 | ∞ | d16 = | 1.408 | | | | |

Table 6 shows aspheric surface data of each lens in the camera optical lens 30 according to Embodiment 3 of the present disclosure.

TABLE 6

| | Conic Coefficient | Aspheric Coefficient | | | | |
|---|---|---|---|---|---|---|
| | k | A4 | A6 | A8 | A10 | A12 |
| R1 | 4.7652E−03 | −1.2051E−03 | 3.6801E−03 | −4.5831E−03 | 3.0117E−03 | −1.1706E−03 |
| R2 | −1.0060E−01 | −2.0728E−03 | −2.4129E−03 | 3.6344E−03 | −2.9616E−03 | 1.4109E−03 |
| R3 | 2.8450E−01 | −6.1472E−03 | 1.9642E−03 | −1.8336E−03 | 1.6960E−03 | −8.3472E−04 |
| R4 | 1.1523E−01 | −4.2631E−03 | 2.8045E−03 | −3.7709E−03 | 3.8940E−03 | −2.2972E−03 |
| R5 | −7.1421E+01 | −5.7982E−03 | −4.7470E−03 | 2.0560E−03 | −1.4569E−03 | 7.0213E−04 |
| R6 | −1.1406E+01 | 4.4683E−03 | −1.3331E−02 | 6.5632E−03 | −2.4499E−03 | 6.8023E−04 |
| R7 | −3.1948E+00 | 1.4949E−03 | −8.5245E−03 | 2.5819E−03 | 4.0777E−04 | −4.5791E−04 |
| R8 | 1.7458E+00 | −1.1355E−02 | 1.9603E−03 | −1.7536E−03 | 9.0293E−04 | −2.7226E−04 |
| R9 | −1.6650E+00 | −1.7095E−02 | 1.3081E−03 | 3.0337E−03 | −2.2594E−03 | 7.3333E−04 |
| R10 | −1.0661E+00 | −1.9502E−02 | −1.6144E−02 | 1.5110E−02 | −7.3072E−03 | 2.4200E−03 |
| R11 | −9.8694E−01 | 3.0838E−02 | −2.2883E−02 | 9.6637E−03 | −3.3610E−03 | 8.6953E−04 |
| R12 | 5.1181E+00 | 4.5952E−02 | −7.0274E−03 | −2.1885E−03 | 1.1686E−03 | −2.6470E−04 |
| R13 | −1.0174E+00 | −4.8944E−02 | 7.7140E−03 | −1.1389E−03 | 1.4717E−04 | −1.2012E−05 |
| R14 | −9.9886E−01 | −6.4004E−02 | 1.4620E−02 | −2.9548E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 4.7652E−03 | 2.7749E−04 | −3.9471E−05 | 3.0977E−06 | −1.0329E−07 | 0.0000E+00 |
| R2 | −1.0060E−01 | −4.0402E−04 | 6.8902E−05 | −6.4539E−06 | 2.5485E−07 | 0.0000E+00 |
| R3 | 2.8450E−01 | 2.5055E−04 | −4.4796E−05 | 4.4021E−06 | −1.8416E−07 | 0.0000E+00 |
| R4 | 1.1523E−01 | 8.3103E−04 | −1.8011E−04 | 2.1485E−05 | −1.0803E−06 | 0.0000E+00 |
| R5 | −7.1421E+01 | −2.1548E−04 | 3.9843E−05 | −3.8792E−06 | 1.4995E−07 | 0.0000E+00 |
| R6 | −1.1406E+01 | −1.2828E−04 | 1.4099E−05 | −6.4348E−07 | −1.7990E−09 | 0.0000E+00 |
| R7 | −3.1948E+00 | 1.3575E−04 | −2.1442E−05 | 1.8368E−06 | −6.6542E−08 | 0.0000E+00 |
| R8 | 1.7458E+00 | 5.1651E−05 | −5.9518E−06 | 3.5821E−07 | −7.6002E−09 | 0.0000E+00 |
| R9 | −1.6650E+00 | −7.9485E−05 | −3.0151E−05 | 1.5568E−05 | −3.5220E−06 | 4.8629E−07 |
| R10 | −1.0661E+00 | −5.8265E−04 | 1.0333E−04 | −1.3514E−05 | 1.2972E−06 | −9.0101E−08 |
| R11 | −9.8694E−01 | −1.6116E−04 | 2.1309E−05 | −2.0235E−06 | 1.3871E−07 | −6.8321E−09 |
| R12 | 5.1181E+00 | 3.7888E−05 | −3.7841E−06 | 2.7507E−07 | −1.4789E−08 | 5.8548E−10 |
| R13 | −1.0174E+00 | 4.6461E−07 | 7.5632E−09 | −1.9160E−09 | 1.1039E−10 | −3.6033E−12 |
| R14 | −9.9886E−01 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 4.7652E−03 | 0.0000E+00 | 0.0000E+00 | 0.0000E+00 | 0.0000E+00 | / |
| R2 | −1.0060E−01 | 0.0000E+00 | 0.0000E+00 | 0.0000E+00 | 0.0000E+00 | / |
| R3 | 2.8450E−01 | 0.0000E+00 | 0.0000E+00 | 0.0000E+00 | 0.0000E+00 | / |
| R4 | 1.1523E−01 | 0.0000E+00 | 0.0000E+00 | 0.0000E+00 | 0.0000E+00 | / |
| R5 | −7.1421E+01 | 0.0000E+00 | 0.0000E+00 | 0.0000E+00 | 0.0000E+00 | / |
| R6 | −1.1406E+01 | 0.0000E+00 | 0.0000E+00 | 0.0000E+00 | 0.0000E+00 | / |
| R7 | −3.1948E+00 | 0.0000E+00 | 0.0000E+00 | 0.0000E+00 | 0.0000E+00 | / |
| R8 | 1.7458E+00 | 0.0000E+00 | 0.0000E+00 | 0.0000E+00 | 0.0000E+00 | / |
| R9 | −1.6650E+00 | −4.3206E−08 | 2.4160E−09 | −7.7446E−11 | 1.0846E−12 | / |
| R10 | −1.0661E+00 | 4.4007E−09 | −1.4314E−10 | 2.7806E−12 | −2.4377E−14 | / |
| R11 | −9.8694E−01 | 2.3679E−10 | −5.5000E−12 | 7.7044E−14 | −4.9281E−16 | / |
| R12 | 5.1181E+00 | −1.6627E−11 | 3.2028E−13 | −3.7386E−15 | 1.9902E−17 | / |
| R13 | −1.0174E+00 | 7.3591E−14 | −9.2830E−16 | 6.5708E−18 | −1.9644E−20 | / |
| R14 | −9.9886E−01 | −1.8904E−13 | 2.0927E−15 | −1.3728E−17 | 4.0358E−20 | / |

Figure 10:
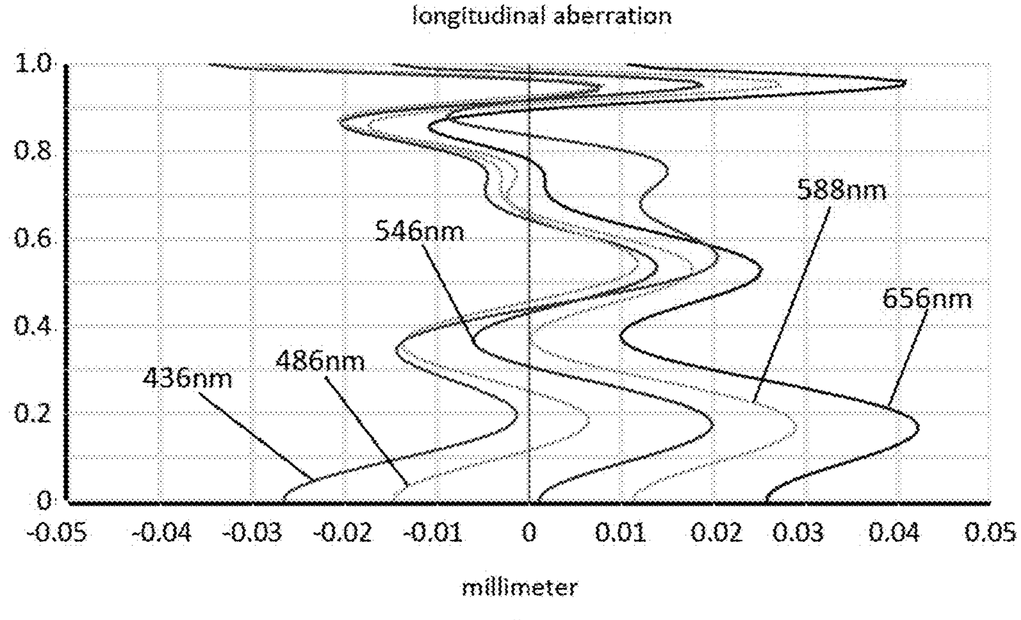
FIG. 10 is a schematic diagram of longitudinal aberration of the camera optical lens shown in FIG. 9.
Figure 11:
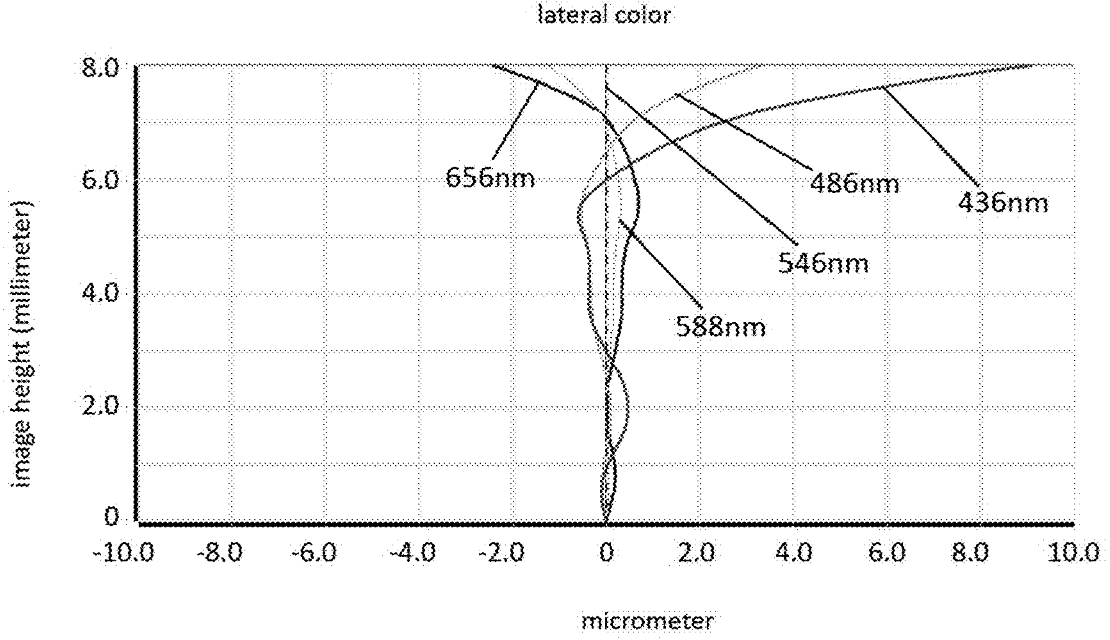
FIG. 11 is a schematic diagram of lateral color of the camera optical lens shown in FIG. 9.
Figure 12:
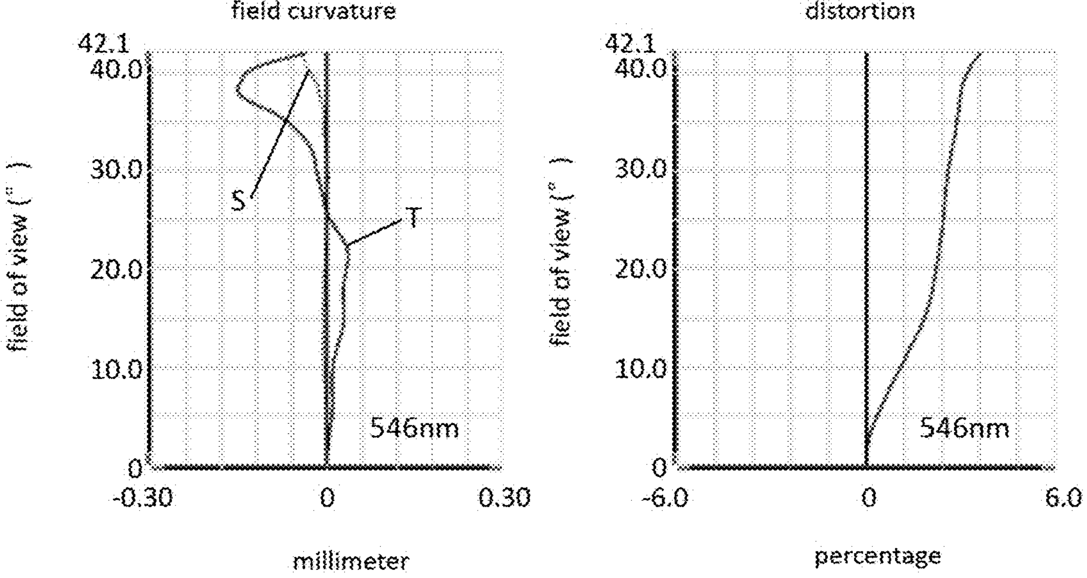
FIG. 12 is a schematic diagram of field curvature and distortion of the camera optical lens shown in FIG. 9.

FIG. 10 and FIG. 11 respectively show longitudinal aberration and lateral color of light with wavelengths of 656 nm, 588 nm, 546 nm, 486 nm and 436 nm after passing through the camera optical lens 30 according to Embodiment 3. FIG. 12 shows field curvature and distortion of light with a wavelength of 546 nm after passing through the camera optical lens 30 according to Embodiment 3. The field curvature S in FIG. 12 is the field curvature in the sagittal direction, and T is the field curvature in the meridian direction.

In the embodiment, the entrance pupil diameter ENPD of the camera optical lens 30 is 4.882 mm, the full field of view (1.0 field of view) image height IH is 8.000 mm, the MIC field of view image height IH is 8.290 mm, the field of view FOV of the full field of view (1.0 field of view) in a diagonal direction is 84.20°, the field of view FOV of the MIC field of view in a diagonal direction is 86.07°, the camera optical lens 30 meets the design requirements of good processability, ultra-thin, and the on-axis and off-axis chromatic aberrations are sufficiently corrected and have excellent optical characteristics.

Embodiment 4

The meaning of the reference signs of Embodiment 4 is the same as that of Embodiment 1.

Figure 13:
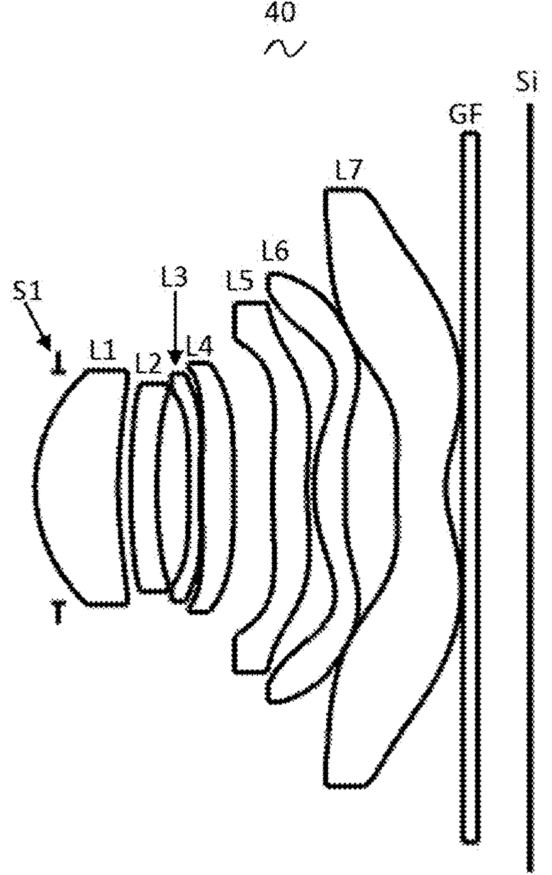
FIG. 13 is a structural schematic diagram of a camera optical lens according to Embodiment 4 of the present disclosure.

FIG. 13 shows a camera optical lens 40 according to Embodiment 4 of the present disclosure.

Table 7 and Table 8 show design data of the camera optical lens 40 according to Embodiment 4 of the present disclosure.

TABLE 7

| | R | | d | | nd | | vd |
|---|---|---|---|---|---|---|---|
| S1 | ∞ | d0 = | −0.475 | | | | |
| R1 | 3.391 | d1 = | 1.700 | nd1 | 1.4959 | v1 | 81.65 |
| R2 | 9.728 | d2 = | 0.250 | | | | |
| R3 | 11.835 | d3 = | 0.542 | nd2 | 1.6700 | v2 | 19.39 |
| R4 | 10.107 | d4 = | 0.652 | | | | |
| R5 | −101.211 | d5 = | 0.236 | nd3 | 1.6700 | v3 | 19.39 |
| R6 | 37.759 | d6 = | 0.032 | | | | |
| R7 | 27.558 | d7 = | 0.655 | nd4 | 1.5444 | v4 | 55.82 |
| R8 | −327.970 | d8 = | 0.796 | | | | |
| R9 | 11.513 | d9 = | 0.719 | nd5 | 1.5661 | v5 | 37.71 |
| R10 | 6.948 | d10 = | 0.151 | | | | |
| R11 | 5.089 | d11 = | 0.635 | nd6 | 1.5444 | v6 | 55.82 |
| R12 | −44.141 | d12 = | 1.044 | | | | |
| R13 | 10.977 | d13 = | 1.018 | nd7 | 1.5346 | v7 | 55.69 |
| R14 | 2.498 | d14 = | 0.350 | | | | |
| R15 | ∞ | d15 = | 0.310 | ndg | 1.5168 | vg | 64.17 |
| R16 | ∞ | d16 = | 1.067 | | | | |

Table 8 shows aspheric surface data of each lens in the camera optical lens 40 according to Embodiment 4 of the present disclosure.

TABLE 8

| | Conic Coefficient | Aspheric Coefficient | | | | |
|---|---|---|---|---|---|---|
| | k | A4 | A6 | A8 | A10 | A12 |
| R1 | 5.5176E−03 | −1.3172E−03 | 3.6984E−03 | −4.5795E−03 | 3.0120E−03 | −1.1706E−03 |
| R2 | −2.4524E+00 | −2.9229E−03 | −2.3126E−03 | 3.6421E−03 | −2.9625E−03 | 1.4106E−03 |
| R3 | −1.9963E+00 | −6.3262E−03 | 1.8119E−03 | −1.8607E−03 | 1.6906E−03 | −8.3541E−04 |
| R4 | 2.8445E+00 | −3.9580E−03 | 2.7081E−03 | −3.7895E−03 | 3.8897E−03 | −2.2978E−03 |
| R5 | 1.1206E+03 | −5.8354E−03 | −4.8127E−03 | 2.0598E−03 | −1.4521E−03 | 7.0318E−04 |
| R6 | −2.8139E+01 | 4.0511E−03 | −1.3377E−02 | 6.5512E−03 | −2.4513E−03 | 6.8031E−04 |
| R7 | −7.1187E+01 | 1.0122E−03 | −8.6344E−03 | 2.5673E−03 | 4.0582E−04 | −4.5815E−04 |
| R8 | 4.9863E+03 | −1.1565E−02 | 1.9097E−03 | −1.7585E−03 | 9.0253E−04 | −2.7224E−04 |
| R9 | 2.9665E+00 | −1.5207E−02 | 1.1182E−03 | 3.0235E−03 | −2.2592E−03 | 7.3340E−04 |
| R10 | −1.7031E+00 | −1.9730E−02 | −1.6147E−02 | 1.5110E−02 | −7.3072E−03 | 2.4200E−03 |
| R11 | −9.3703E−01 | 3.0955E−02 | −2.2888E−02 | 9.6636E−03 | −3.3611E−03 | 8.6953E−04 |
| R12 | 5.7424E+01 | 4.5096E−02 | −6.9924E−03 | −2.1893E−03 | 1.1685E−03 | −2.6470E−04 |
| R13 | −8.0726E−01 | −4.8855E−02 | 7.7149E−03 | −1.1390E−03 | 1.4717E−04 | −1.2012E−05 |
| R14 | −9.9056E−01 | −6.3965E−02 | 1.4619E−02 | −2.9549E−03 | 4.6757E−04 | −5.5096E−05 |

| | Conic Coefficient | Aspheric Coefficient | | | | |
|---|---|---|---|---|---|---|
| | k | A14 | A16 | A18 | A20 | A22 |
| R1 | 5.5176E−03 | 2.7749E−04 | −3.9472E−05 | 3.0978E−06 | −1.0326E−07 | 0.0000E+00 |
| R2 | −2.4524E+00 | −4.0406E−04 | 6.8901E−05 | −6.4542E−06 | 2.5507E−07 | 0.0000E+00 |
| R3 | −1.9963E+00 | 2.5047E−04 | −4.4800E−05 | 4.4024E−06 | −1.8401E−07 | 0.0000E+00 |
| R4 | 2.8445E+00 | 8.3100E−04 | −1.8009E−04 | 2.1489E−05 | −1.0833E−06 | 0.0000E+00 |
| R5 | 1.1206E+03 | −2.1544E−04 | 3.9838E−05 | −3.8853E−06 | 1.4858E−07 | 0.0000E+00 |
| R6 | −2.8139E+01 | −1.2825E−04 | 1.4107E−05 | −6.4391E−07 | −1.7555E−09 | 0.0000E+00 |
| R7 | −7.1187E+01 | 1.3571E−04 | −2.1446E−05 | 1.8356E−06 | −6.6655E−08 | 0.0000E+00 |
| R8 | 4.9863E+03 | 5.1649E−05 | −5.9510E−06 | 3.5821E−07 | −7.6683E−09 | 0.0000E+00 |
| R9 | 2.9665E+00 | −7.9480E−05 | −3.0150E−05 | 1.5568E−05 | −3.5220E−06 | 4.8629E−07 |
| R10 | −1.7031E+00 | −5.8265E−04 | 1.0333E−04 | −1.3514E−05 | 1.2972E−06 | −9.0101E−08 |
| R11 | −9.3703E−01 | −1.6116E−04 | 2.1309E−05 | −2.0235E−06 | 1.3871E−07 | −6.8321E−09 |
| R12 | 5.7424E+01 | 3.7888E−05 | −3.7841E−06 | 2.7507E−07 | −1.4789E−08 | 5.8548E−10 |
| R13 | −8.0726E−01 | 4.6461E−07 | 7.5632E−09 | −1.9160E−09 | 1.1039E−10 | −3.6033E−12 |
| R14 | −9.9056E−01 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 5.5176E−03 | 0.0000E+00 | 0.0000E+00 | 0.0000E+00 | 0.0000E+00 | / |
| R2 | −2.4524E+00 | 0.0000E+00 | 0.0000E+00 | 0.0000E+00 | 0.0000E+00 | / |
| R3 | −1.9963E+00 | 0.0000E+00 | 0.0000E+00 | 0.0000E+00 | 0.0000E+00 | / |
| R4 | 2.8445E+00 | 0.0000E+00 | 0.0000E+00 | 0.0000E+00 | 0.0000E+00 | / |
| R5 | 1.1206E+03 | 0.0000E+00 | 0.0000E+00 | 0.0000E+00 | 0.0000E+00 | / |
| R6 | −2.8139E+01 | 0.0000E+00 | 0.0000E+00 | 0.0000E+00 | 0.0000E+00 | / |
| R7 | −7.1187E+01 | 0.0000E+00 | 0.0000E+00 | 0.0000E+00 | 0.0000E+00 | / |
| R8 | 4.9863E+03 | 0.0000E+00 | 0.0000E+00 | 0.0000E+00 | 0.0000E+00 | / |
| R9 | 2.9665E+00 | −4.3206E−08 | 2.4160E−09 | −7.7446E−11 | 1.0846E−12 | / |
| R10 | −1.7031E+00 | 4.4007E−09 | −1.4314E−10 | 2.7806E−12 | −2.4377E−14 | / |
| R11 | −9.3703E−01 | 2.3679E−10 | −5.5000E−12 | 7.7044E−14 | −4.9281E−16 | / |

TABLE 8-continued

| | | | | | | |
|---|---|---|---|---|---|---|
| R12 | 5.7424E+01 | −1.6627E−11 | 3.2028E−13 | −3.7386E−15 | 1.9901E−17 | / |
| R13 | −8.0726E−01 | 7.3591E−14 | −9.2830E−16 | 6.5708E−18 | −1.9643E−20 | / |
| R14 | −9.9056E−01 | −1.8904E−13 | 2.0927E−15 | −1.3728E−17 | 4.0358E−20 | / |

Figure 14:
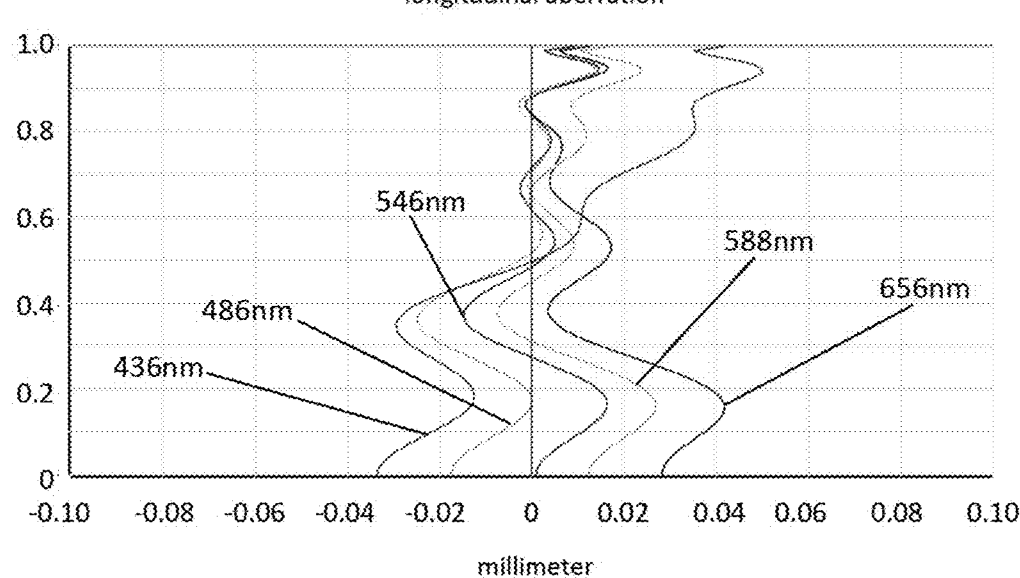
FIG. 14 is a schematic diagram of longitudinal aberration of the camera optical lens shown in FIG. 13.
Figure 15:
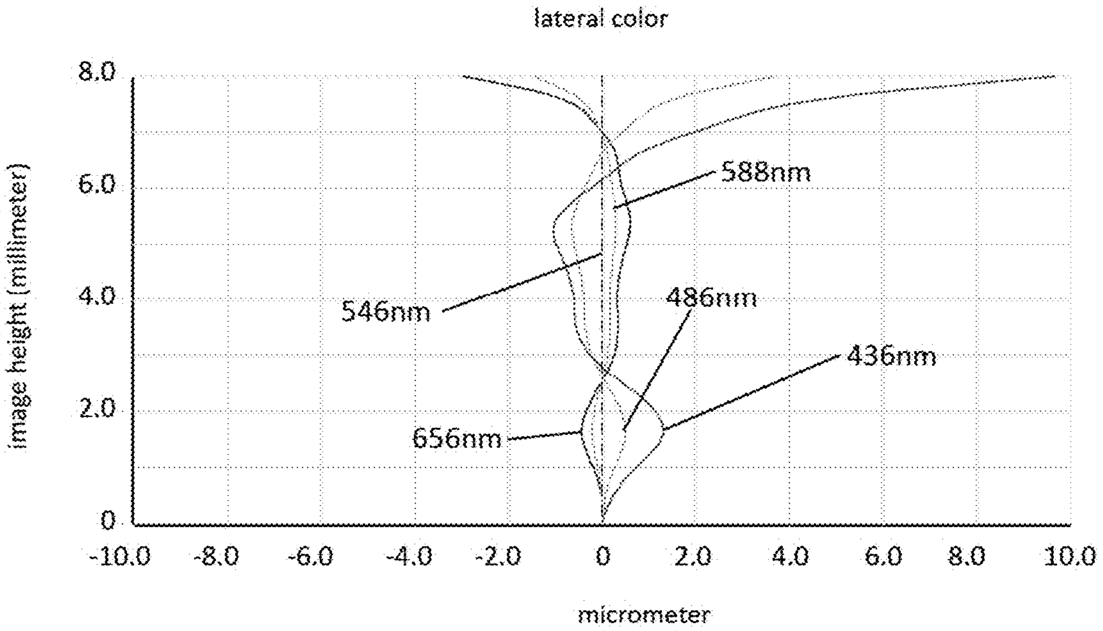
FIG. 15 is a schematic diagram of lateral color of the camera optical lens shown in FIG. 13.
Figure 16:
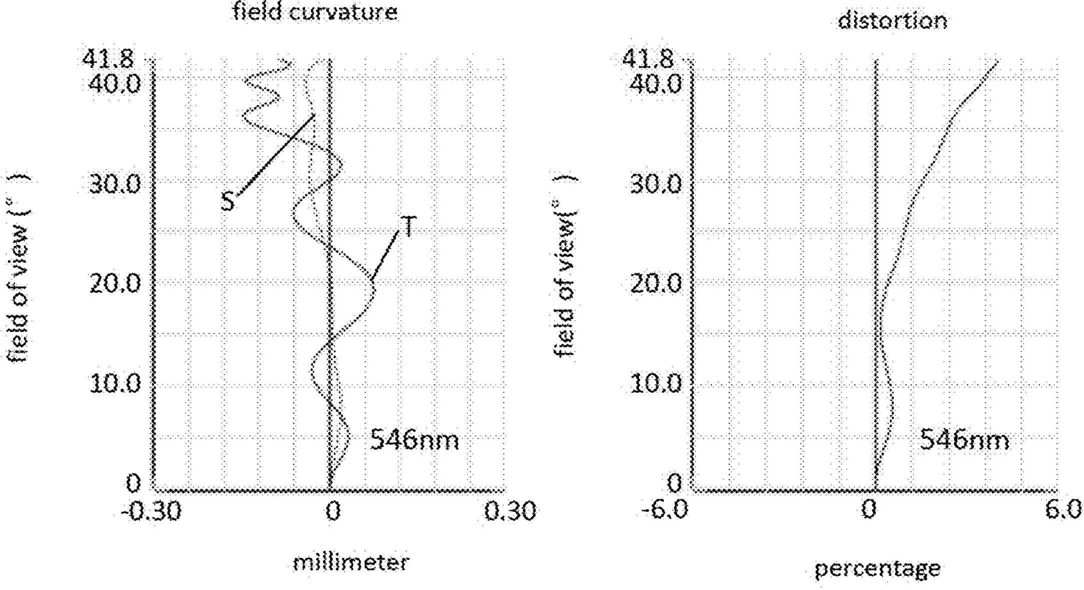
FIG. 16 is a schematic diagram of field curvature and distortion of the camera optical lens shown in FIG. 13.

FIG. 14 and FIG. 15 respectively show longitudinal aberration and lateral color of light with wavelengths of 656 nm, 588 nm, 546 nm, 486 nm and 436 nm after passing through the camera optical lens 40 according to Embodiment 4. FIG. 16 shows field curvature and distortion of light with a wavelength of 546 nm after passing through the camera optical lens 40 according to Embodiment 4. The field curvature S in FIG. 16 is the field curvature in the sagittal direction, and T is the field curvature in the meridian direction.

In the embodiment, the entrance pupil diameter ENPD of the camera optical lens 40 is 4.923 mm, the full field of view (1.0 field of view) image height IH is 8.000 mm, the MIC field of view image height IH is 8.200 mm, the field of view FOV of the full field of view (1.0 field of view) in a diagonal direction is 83.52°, the field of view FOV of the MIC field of view in a diagonal direction is 84.97°, the camera optical lens 40 meets the design requirements of good processability, ultra-thin, and the on-axis and off-axis chromatic aberrations are sufficiently corrected and have excellent optical characteristics.

Table 9 appears later to show values of various values in Embodiment 1, Embodiment 2, Embodiment 3 and Embodiment 4 corresponding to parameters specified in the conditional formula.

TABLE 9

| Parameters and Relational Expressions | Embodiment 1 | Embodiment 2 | Embodiment 3 | Embodiment 4 |
|---|---|---|---|---|
| BF/TTL | 0.25 | 0.21 | 0.20 | 0.17 |
| f6/R11 − f7/R13 | 2.85 | 2.54 | 2.60 | 2.20 |
| (d1 + d3)/d2 | 3.77 | 5.08 | 5.18 | 8.97 |
| $d1_{1.5}/d13_{1.5}$ | 1.43 | 1.24 | 1.26 | 1.10 |
| $(d3_{1.5} + d5_{1.5} + d7_{1.5})/(d9_{1.5} + d11_{1.5})$ | 1.50 | 1.37 | 1.33 | 1.21 |
| $d13_{1.5}/d13$ | 1.75 | 1.51 | 1.50 | 1.29 |
| Σd/TTL | 0.40 | 0.45 | 0.46 | 0.54 |
| (d1 + d3 + d13)/d1 | 1.52 | 1.69 | 1.68 | 1.92 |
| f12/f | 1.36 | 1.30 | 1.29 | 1.17 |
| f | 8.576 | 8.518 | 8.544 | 8.614 |
| f1 | 10.453 | 10.136 | 10.118 | 9.609 |
| f2 | −78.577 | −88.341 | −90.359 | −116.88 |
| f3 | −39.49 | −37.997 | −38.177 | −40.524 |
| f4 | 36.998 | 37.808 | 37.67 | 46.529 |
| f5 | −102.113 | −47.993 | −48.557 | −23.544 |
| f6 | 7.822 | 7.617 | 7.776 | 8.019 |
| f7 | −7.104 | −6.635 | −6.618 | −6.815 |
| TTL | 10.144 | 10.150 | 10.184 | 10.157 |
| FNO | 1.75 | 1.75 | 1.75 | 1.75 |

Those skilled in the art may understand that the above embodiments are specific embodiments for implementing the present disclosure, and in practical applications, various changes may be made in form and detail without departing from the spirit and scope of the present disclosure.

What is claimed is:

1. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; an object-side surface of the first lens is convex in a paraxial region, an image-side surface of the first lens is concave in the paraxial region; an object-side surface of the second lens is convex in a paraxial region, an image-side surface of the second lens is concave in the paraxial region; an object-side surface of the third lens is concave in a paraxial region, an image-side surface of the third lens is concave in the paraxial region; an object-side surface of the fourth lens is convex in a paraxial region, an image-side surface of the fourth lens is convex in the paraxial region; an object-side surface of the fifth lens is convex in a paraxial region, an image-side surface of the fifth lens is concave in the paraxial region; an object-side surface of the sixth lens is convex in a paraxial region, an image-side surface of the sixth lens is convex in the paraxial region; an object-side surface of the seventh lens is convex in a paraxial region, an image-side surface of the seventh lens is concave in the paraxial region;

wherein, an on-axis distance from the image-side surface of the seventh lens to an image surface is BF, a total optical length from the object-side surface of the first lens to an image surface of the camera optical lens along an optic axis of the camera optical lens is TTL, a focal length of the sixth lens is f6, a focal length of the seventh lens is f7, a central curvature radius of the object-side surface of the sixth lens in the paraxial region is R11, a central curvature radius of the object-side surface of the seventh lens in the paraxial region is R13, an on-axis thickness of the first lens is d1, an on-axis distance from the first lens to the second lens is d2, an on-axis thickness of the second lens is d3, an on-axis thickness of the seventh lens is d13, an thickness of the first lens along a direction parallel to the optical axis at a radius of 1.5 mm is $d1_{1.5}$, an thickness of the second lens along a direction parallel to the optical axis at a radius of 1.5 mm is $d3_{1.5}$, an thickness of the third lens along a direction parallel to the optical axis at a radius of 1.5 mm is $d5_{1.5}$, an thickness of the fourth lens along a direction parallel to the optical axis at a radius of 1.5 mm is $d7_{1.5}$, an thickness of the fifth lens along a direction parallel to the optical axis at a radius of 1.5 mm is $d9_{1.5}$, an thickness of the sixth lens along a direction parallel to the optical axis at a radius of 1.5 mm is $d11_{1.5}$, an thickness of the seventh lens along a direction parallel to the optical axis at a radius of 1.5 mm is $d13_{1.5}$, and following relational expressions are satisfied:

$$0.16 \leq BF/TTL \leq 0.25;$$

$$2.10 \leq f6/R11 - f7/R13 \leq 2.90;$$

$$3.50 \leq (d1 + d3)/d2 \leq 9.00;$$

$$0.90 \leq d1_{1.5}/d13_{1.5} \leq 1.70;$$

$$1.00 \leq (d3_{1.5} + d5_{1.5} + d7_{1.5})/(d9_{1.5} + d11_{1.5}) \leq 1.80; \text{ and}$$

$$1.10 \leq d13_{1.5}/d13 \leq 2.00.$$

2. The camera optical lens as described in claim 1, wherein a following relational expression is satisfied:

$$1.00 \leq d1_{1.5}/d13_{1.5} \leq 1.50.$$

3. The camera optical lens as described in claim 1, wherein a following relational expression is satisfied:

$$1.20 \leq (d3_{1.5} + d5_{1.5} + d7_{1.5})/(d9_{1.5} + d11_{1.5}) \leq 1.55.$$

4. The camera optical lens as described in claim 1, wherein a following relational expression is satisfied:

$$1.25 \leq d13_{1.5}/d13 \leq 1.80.$$

5. The camera optical lens as described in claim 1, wherein a focal length of the third lens is f3, a focal length of the fourth lens is f4, an on-axis thickness of the third lens is d5, an on-axis thickness of the fourth lens is d7, and a following relational expression is satisfied:

$$-120.00 \leq f3/d5 + f4/d7 \leq -50.00.$$

6. The camera optical lens as described in claim 1, wherein a central curvature radius of the object-side surface of the fifth lens in the paraxial region is R9, a central curvature radius of the image-side surface of the fifth lens in the paraxial region is R10, and a following relational expression is satisfied:

$$3.10 \leq (R9 + R10)/(R9 - R10) \leq 8.50.$$

7. The camera optical lens as described in claim 5, wherein a following relational expression is satisfied:

$$-105.00 \leq f3/d5 + f4/d7 \leq -60.00.$$

8. The camera optical lens as described in claim 6, wherein a following relational expression is satisfied:

$$3.80 \leq (R9 + R10)/(R9 - R10) \leq 7.00.$$

9. The camera optical lens as described in claim 1, wherein the first lens is made of glass.

10. A camera optical lens, comprising seven lenses from an object side to an image side sequentially comprising: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; an object-side surface of the first lens is convex in a paraxial region, an image-side surface of the first lens is concave in the paraxial region; an object-side surface of the second lens is convex in a paraxial region, an image-side surface of the second lens is concave in the paraxial region; an object-side surface of the third lens is concave in a paraxial region, an image-side surface of the third lens is concave in the paraxial region; an object-side surface of the fourth lens is convex in a paraxial region, an image-side surface of the fourth lens is convex in the paraxial region; an object-side surface of the fifth lens is convex in a paraxial region, an image-side surface of the fifth lens is concave in the paraxial region; an object-side surface of the sixth lens is convex in a paraxial region, an image-side surface of the sixth lens is convex in the paraxial region; an object-side surface of the seventh lens is convex in a paraxial region, an image-side surface of the seventh lens is concave in the paraxial region;

wherein a focal length of the camera optical lens is f, a combined focal length of the first lens and the second lens is f12, an on-axis thickness of the first lens is d1, an on-axis thickness of the second lens is d3, an on-axis thickness of the seventh lens is d13, an thickness of the first lens along a direction parallel to the optical axis at a radius of 1.5 mm is $d1_{1.5}$, an thickness of the second lens along a direction parallel to the optical axis at a radius of 1.5 mm is $d3_{1.5}$, an thickness of the third lens along a direction parallel to the optical axis at a radius of 1.5 mm is $d5_{1.5}$, an thickness of the fourth lens along a direction parallel to the optical axis at a radius of 1.5 mm is $d7_{1.5}$, an thickness of the fifth lens along a direction parallel to the optical axis at a radius of 1.5 mm is $d9_{1.5}$, an thickness of the sixth lens along a direction parallel to the optical axis at a radius of 1.5 mm is $d11_{1.5}$, an thickness of the seventh lens along a direction parallel to the optical axis at a radius of 1.5 mm is $d13_{1.5}$, a sum of on-axis thicknesses of the first lens, the second lens, the third lens, the fourth lens, the fifth lens, the sixth lens and the seventh lens is Ed, a total optical length from the object-side surface of the first lens to an image surface of the camera optical lens along an optic axis is TTL, and following relational expressions are satisfied:

$$0.90 \le d1_{1.5}/d13_{1.5} \le 1.70;$$

$$1.00 \le (d3_{1.5} + d5_{1.5} + d7_{1.5})/(d9_{1.5} + d11_{1.5}) \le 1.80; \text{ and}$$

$$1.10 \le d13_{1.5}/d13 \le 2.00;$$

$$0.30 \le \sum d/TTL \le 0.65;$$

$$1.20 \le (d1 + d3 + d13)/d1 \le 2.30;$$

$$0.90 \le f12/f \le 1.60.$$

11. The camera optical lens as described in claim 10, wherein a following relational expression is satisfied:

$$0.38 \le \sum d/TTL \le 0.58.$$

12. The camera optical lens as described in claim 10, wherein a following relational expression is satisfied:

$$1.50 \le (d1 + d3 + d13)/d1 \le 2.00.$$

13. The camera optical lens as described in claim 10, wherein a following relational expression is satisfied:

$$1.10 \le f12/f \le 1.40.$$

14. The camera optical lens as described in claim 10, wherein a following relational expression is satisfied:

$$1.00 \le d1_{1.5}/d13_{1.5} \le 1.50.$$

15. The camera optical lens as described in claim 10, wherein a following relational expression is satisfied:

$$1.20 \le (d3_{1.5} + d5_{1.5} + d7_{1.5})/(d9_{1.5} + d11_{1.5}) \le 1.55.$$

16. The camera optical lens as described in claim 10, wherein a following relational expression is satisfied:

$$1.25 \le d13_{1.5}/d13 \le 1.80.$$

17. The camera optical lens as described in claim 10, wherein a central curvature radius of the object-side surface of the first lens in the paraxial region is R1, a central curvature radius of the image-side surface of the first lens in the paraxial region is R2, and the following relational expression is satisfied:

$$-2.50 \le (R1 + R2)/(R1 - R2) \le -1.60.$$

18. The camera optical lens as described in claim 10, wherein an on-axis thickness of the fourth lens is d7, an on-axis distance from the fourth lens and the fifth lens is d8, an on-axis thickness of the fifth lens is d9, and a following relational expression is satisfied:

$$1.10 \le (d7 + d9)/d8 \le 2.10.$$

19. The camera optical lens as described in claim 17, wherein a following relational expression is satisfied:

$$-2.20 \le (R1 + R2)/(R1 - R2) \le -1.90.$$

20. The camera optical lens as described in claim 10, wherein the first lens is made of glass.

* * * * *